(12) United States Patent
Usami

(10) Patent No.: US 8,488,346 B2
(45) Date of Patent: Jul. 16, 2013

(54) POWER CONVERSION APPARATUS AND METHOD

(75) Inventor: Yutaka Usami, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/219,312

(22) Filed: Aug. 26, 2011

(65) Prior Publication Data

US 2012/0092911 A1 Apr. 19, 2012

(30) Foreign Application Priority Data

Oct. 18, 2010 (JP) ................................ 2010-233624

(51) Int. Cl.
*H02M 1/12* (2006.01)
*H02M 1/14* (2006.01)
*H02M 7/68* (2006.01)

(52) U.S. Cl.
USPC .............. 363/44; 363/47; 363/45; 363/81; 363/82; 363/84; 363/89; 363/92; 363/21.06; 363/21.14

(58) Field of Classification Search
USPC ............... 363/21.06, 21.14, 44, 45, 47, 81, 363/82, 84, 87, 89, 92
See application file for complete search history.

(56) References Cited

U.S. PATENT DOCUMENTS

| 5,289,361 | A | * | 2/1994 | Vinciarelli | ........................ 363/80 |
| 5,406,192 | A | * | 4/1995 | Vinciarelli | ..................... 323/222 |
| 6,111,769 | A | * | 8/2000 | Zhang et al. | ................... 363/127 |
| 6,426,884 | B1 | * | 7/2002 | Sun | .................................. 363/17 |
| 6,438,009 | B2 | * | 8/2002 | Assow | ........................... 363/127 |
| 6,490,183 | B2 | * | 12/2002 | Zhang | .............................. 363/89 |
| 6,661,209 | B2 | * | 12/2003 | Patel | .............................. 323/267 |
| 7,272,019 | B2 | * | 9/2007 | Nakagawa | ....................... 363/16 |
| 7,859,868 | B2 | * | 12/2010 | Huang | ............................. 363/53 |
| 2002/0085402 | A1 | * | 7/2002 | Zhang | ........................... 363/127 |
| 2003/0112645 | A1 | * | 6/2003 | Schlecht | ......................... 363/89 |

FOREIGN PATENT DOCUMENTS

| JP | 2001-178140 | 6/2001 |
| JP | 2007-110869 | 4/2007 |
| JP | 2008-295248 | 12/2008 |

* cited by examiner

*Primary Examiner* — Bao Q Vu
(74) *Attorney, Agent, or Firm* — Patterson & Sheridan, L.L.P.

(57) ABSTRACT

According to one embodiment, a power conversion apparatus determines a peak value of circuit current in each pulse cycle, from a corrected output voltage value by subtracting a predetermined reference voltage from an output voltage detected by the output voltage detector, and an input voltage detected by the input voltage detector. The pulse signal output unit outputs a pulse signal to the first switch when the polarity of input voltage is positive, and outputs a pulse signal to the second switch when the polarity of input voltage is negative. A pulse signal turns on in synchronization with a clock signal input from the oscillator, and is kept on until the circuit current detected by the circuit current detector reaches the peak value. A pulse signal turns off when the circuit current reaches the peak value, and turns on again in synchronization with the next clock signal.

20 Claims, 13 Drawing Sheets

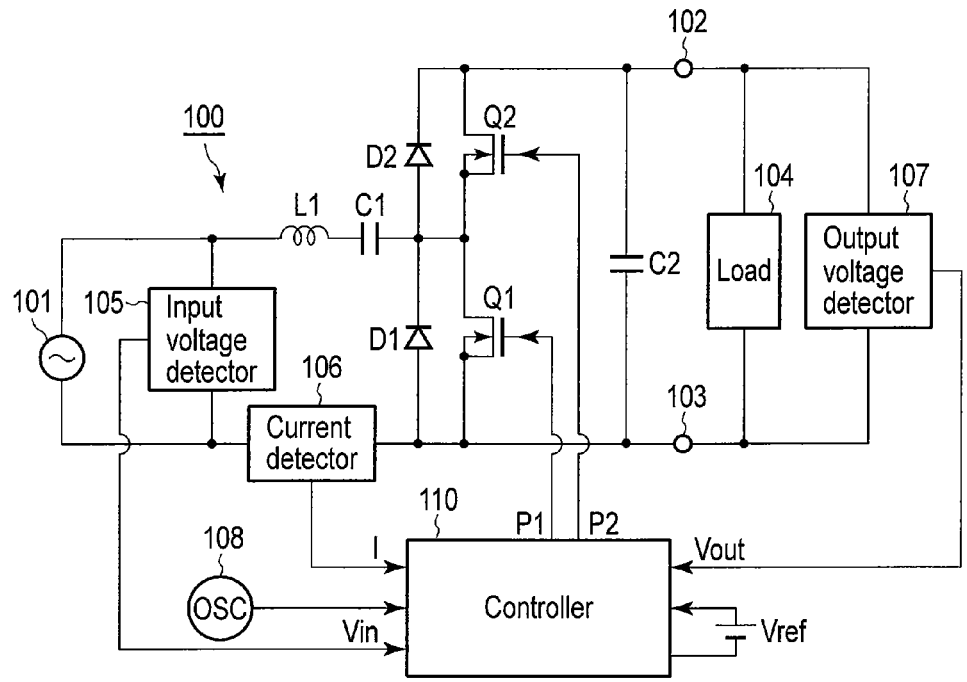
F I G. 1
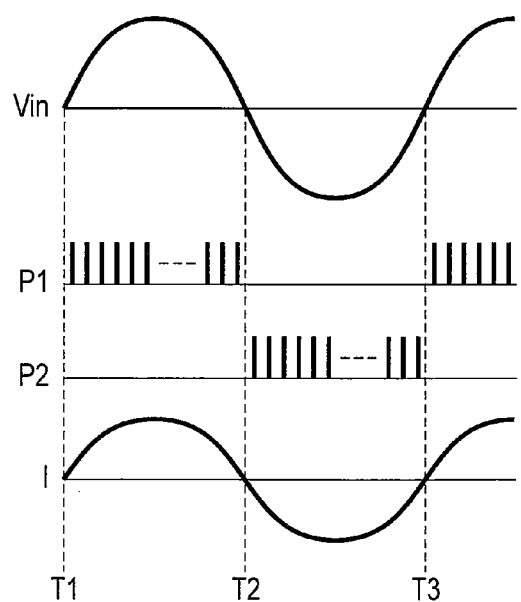
F I G. 2

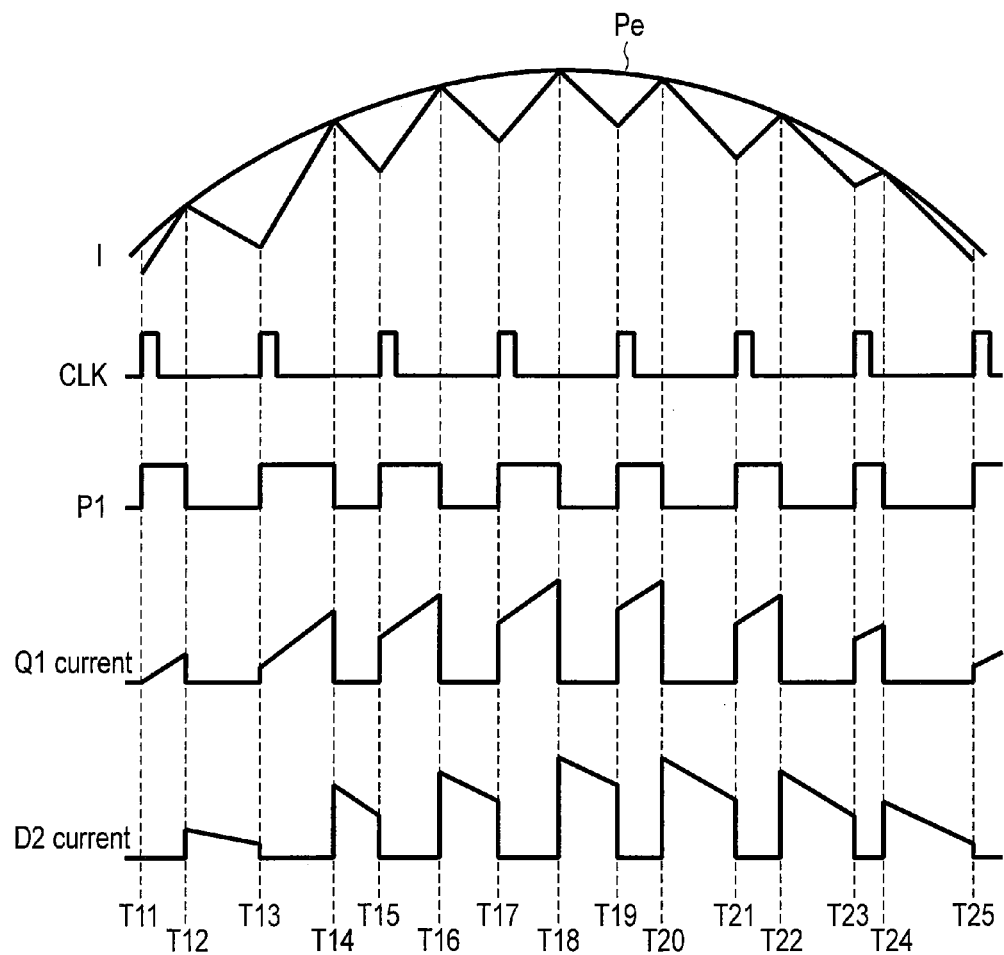
F I G. 4

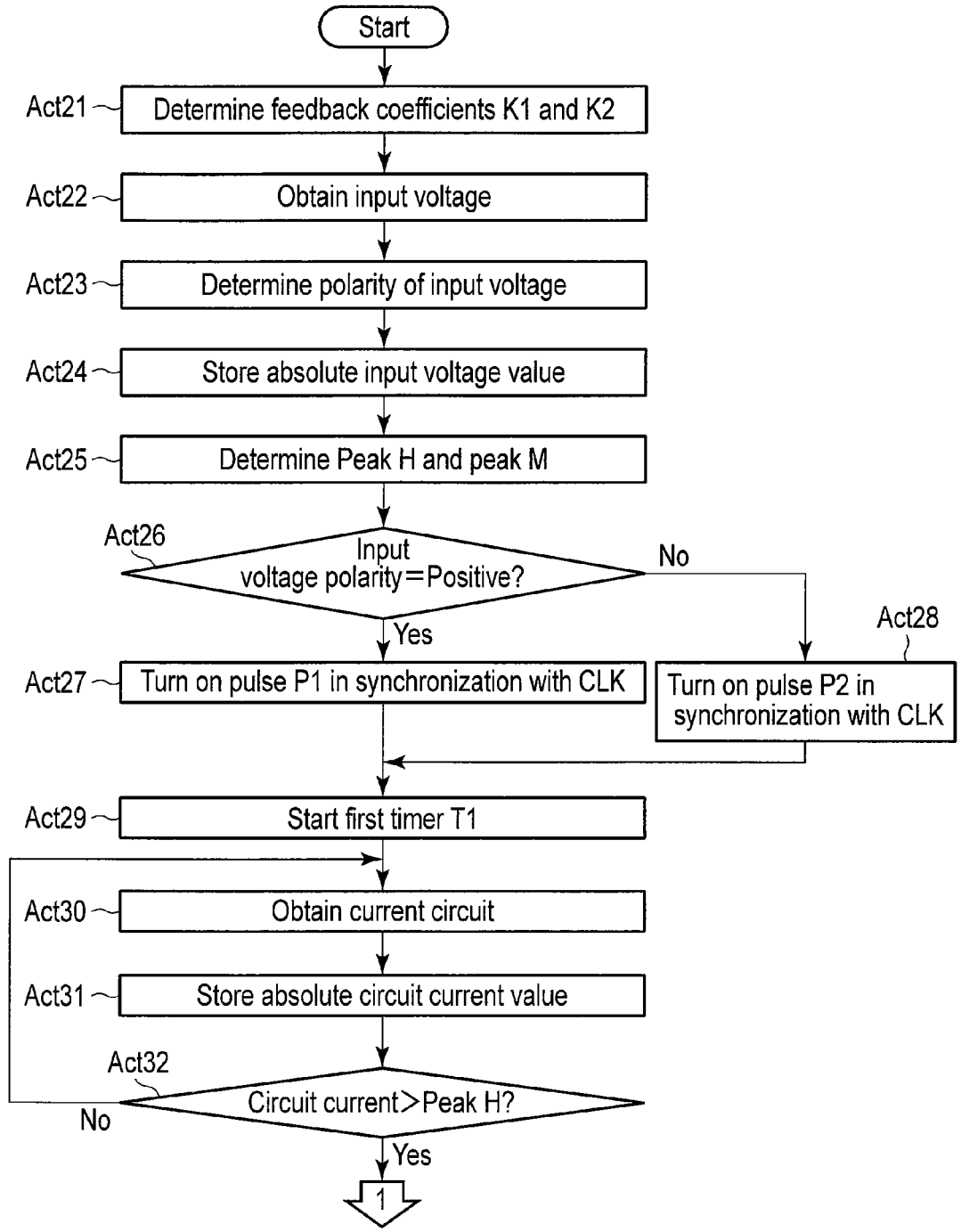
F I G. 7

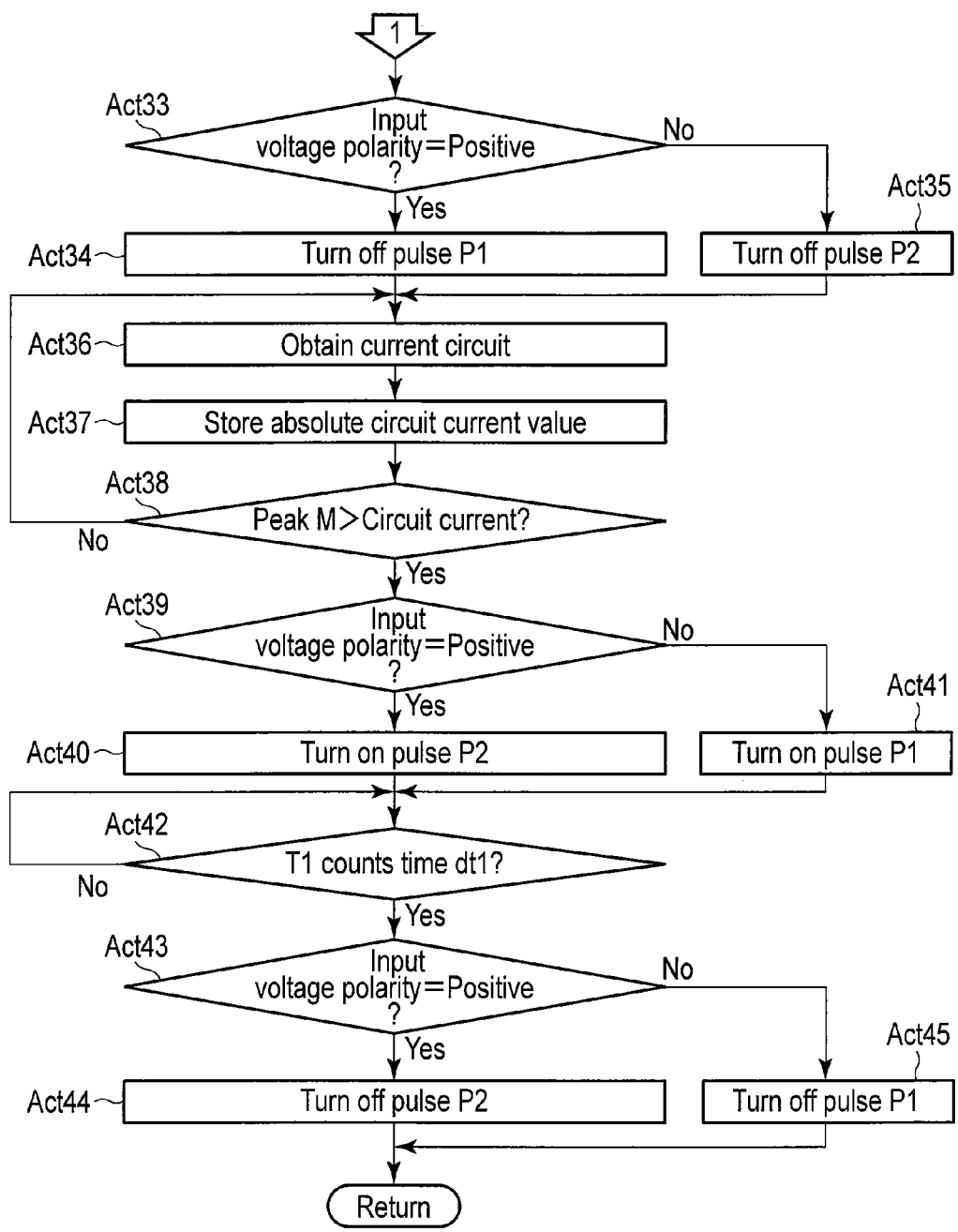
F I G. 8

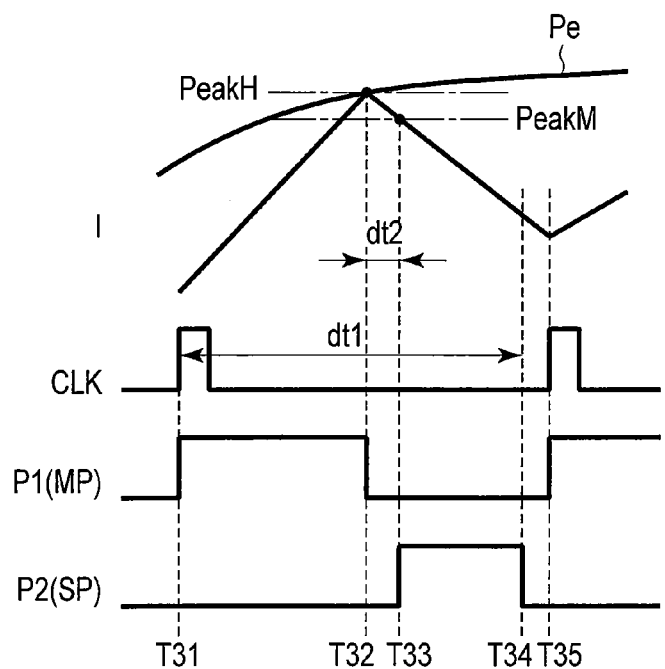
F I G. 1 0
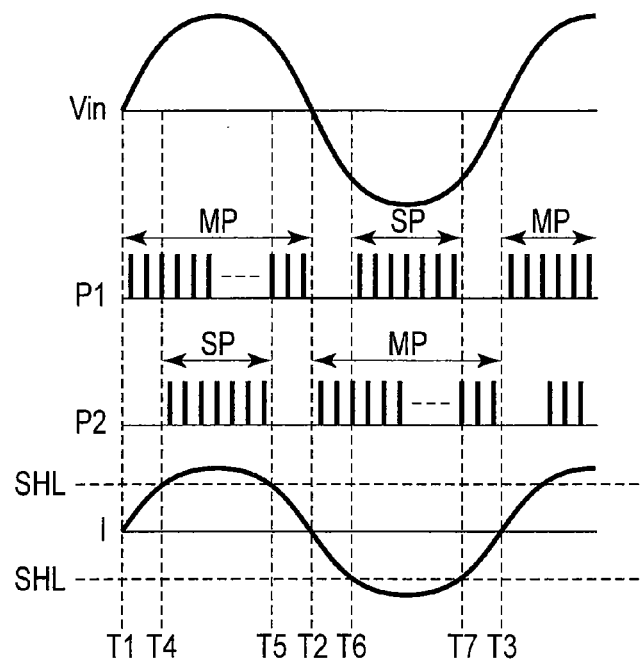
F I G. 1 2

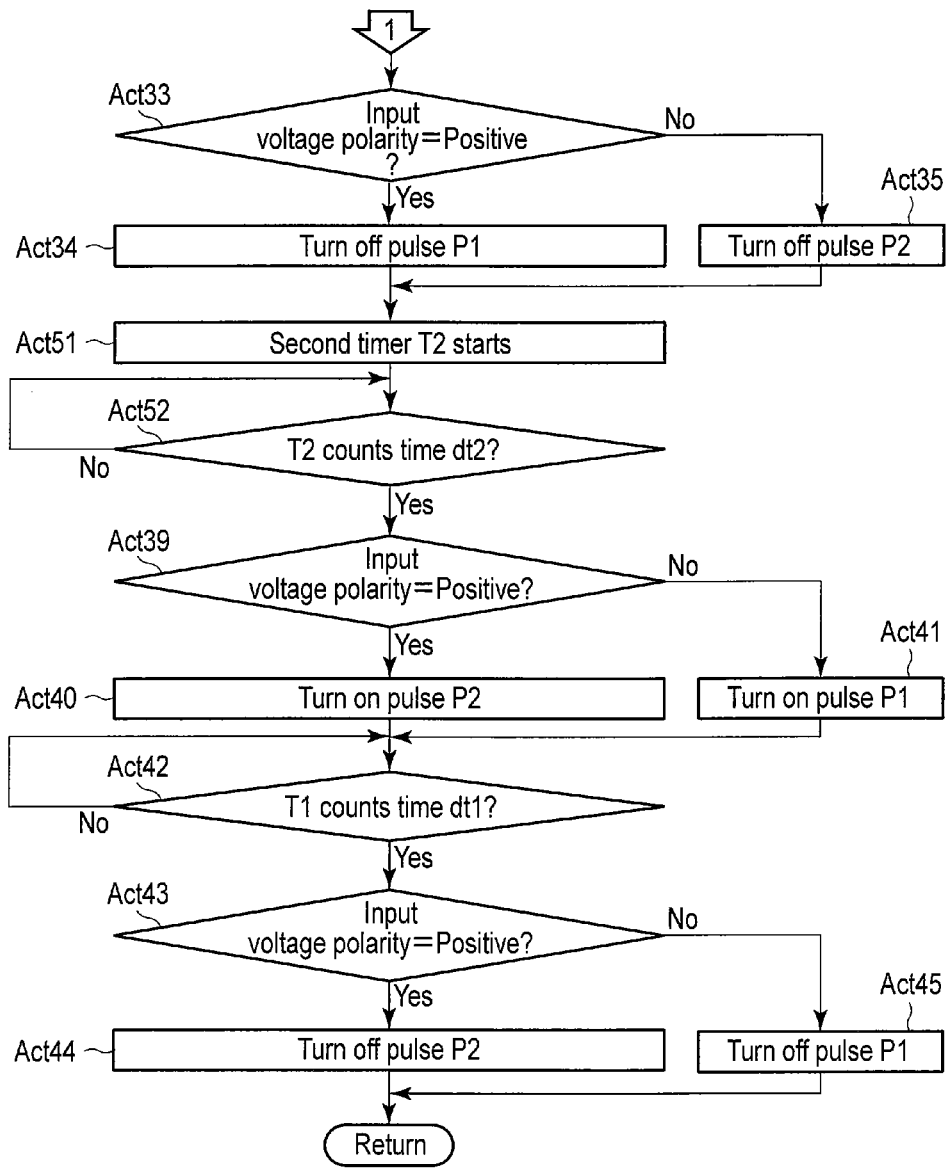
F I G. 1 1

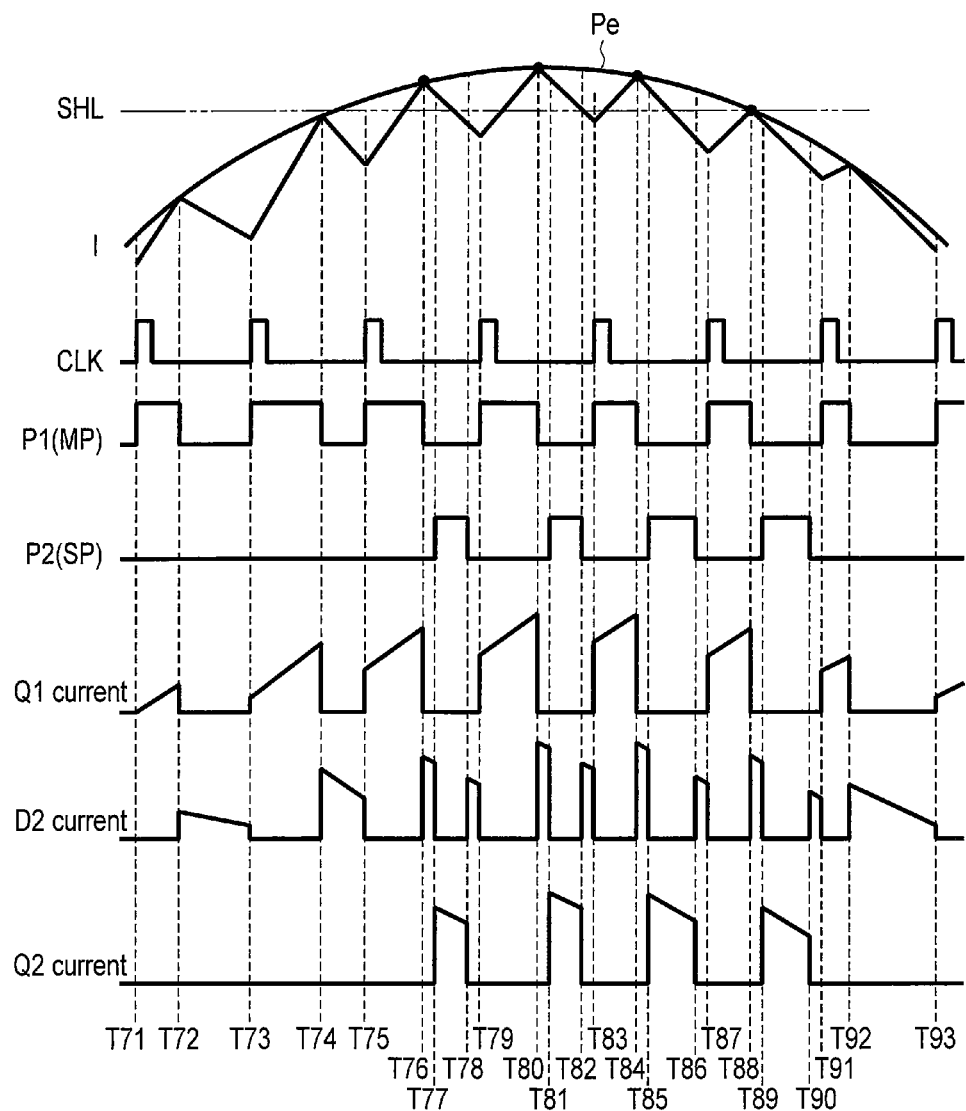
F I G. 14

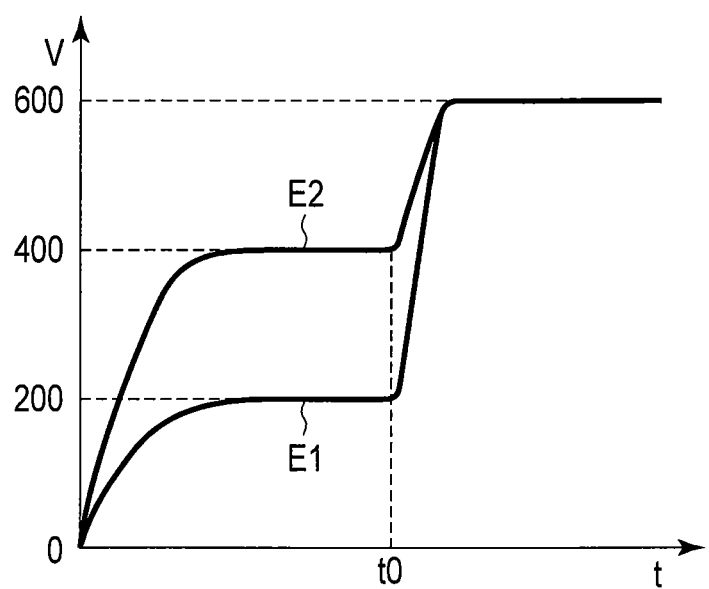
F I G. 1 5

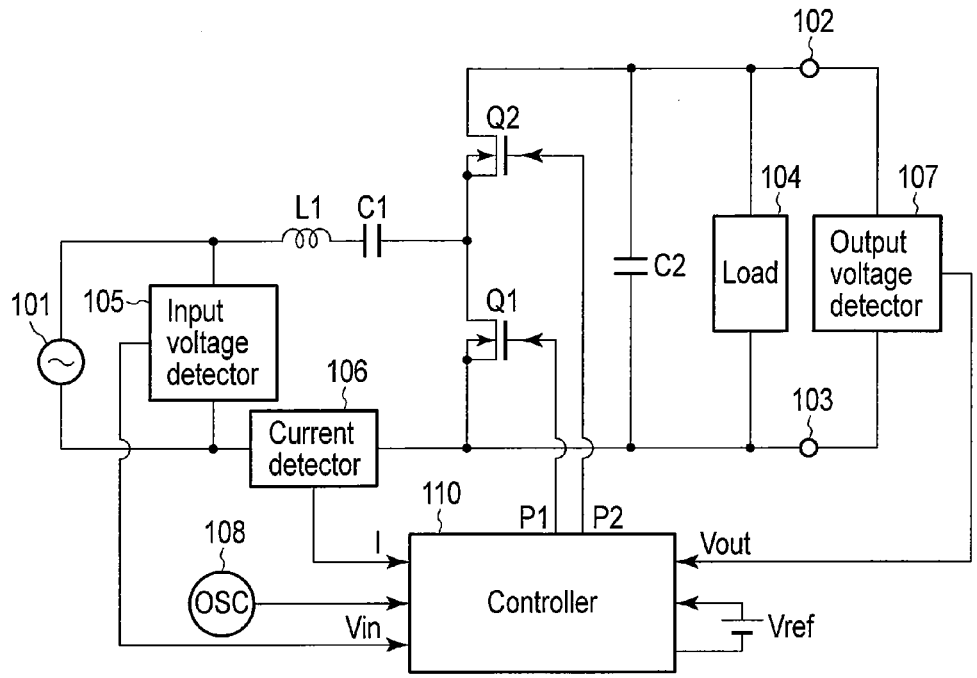
F I G. 16
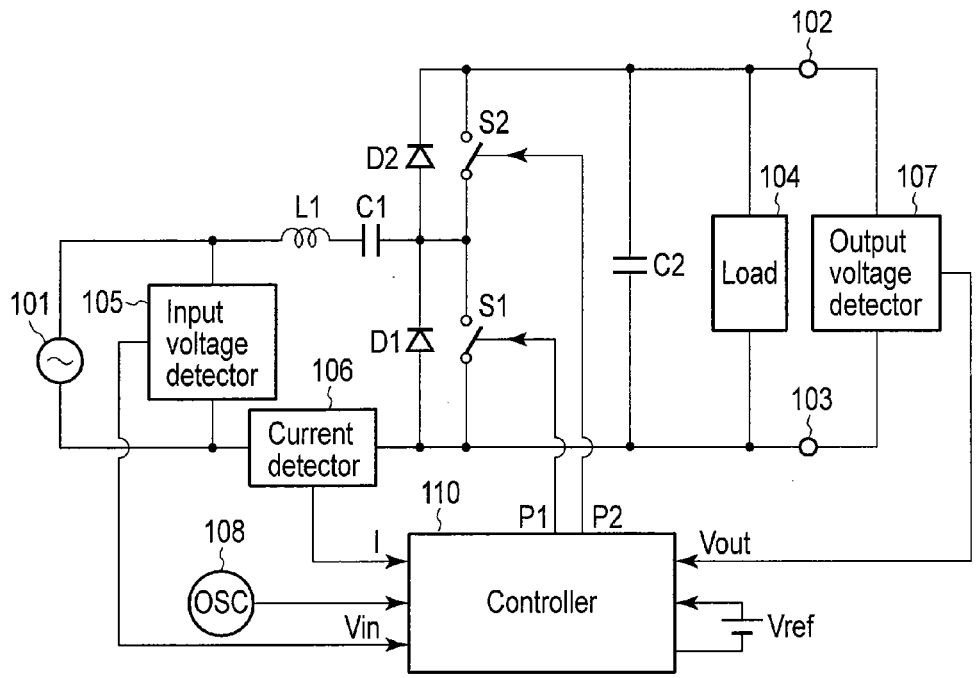
F I G. 17

POWER CONVERSION APPARATUS AND METHOD

CROSS-REFERENCE TO RELATED APPLICATIONS

This application is based upon and claims the benefit of priority from prior Japanese Patent Application No. 2010-233624, filed on Oct. 18, 2010, the entire contents of which are incorporated herein by reference.

FIELD

Embodiments described herein relate generally to a power conversion apparatus, which supplies power to a load by converting an AC voltage obtained from an AC power supply to a DC voltage.

BACKGROUND

There are two methods of converting an AC voltage to a DC voltage. A first method uses a diode bridge circuit and a smoothing capacitor. A diode bridge circuit performs full-wave rectification of an alternating current supplied from an AC power supply. A smoothing capacitor smooths a direct current after full-wave rectification.

In the first method, a current always flows through a series circuit comprising two diodes in either case where an AC voltage is positive or negative. At this time, a power loss equivalent to the product of a current flowing through each diode and a forward voltage of a diode occurs in two diodes.

In a second method, a power factor converter (PFC) is used between a diode bridge circuit and a smoothing capacitor in the first method. A power factor converter increases the voltage of a direct current after full-wave rectification by a diode bridge circuit.

In the second method, a current flows in a series circuit comprising two diodes during full-wave rectification, and a power loss occurs. In addition, a current flows alternately in a field-effect transistor (FET) and diode comprising a power rector converter, causing additional loss.

Further, in a power factor converter, an output voltage must be set higher than an input voltage to obtain a sinusoidal waveform of an input current. However, a voltage required by a load is not necessarily higher than an input voltage. In such a case, a step-down converter is connected to a later stage of a power factor converter, thereby decreasing the voltage increased by a power factor converter to a desired value. A loss occurs while decreasing the voltage. As a whole unit, a power conversion apparatus comprises three stages of an AC-DC converter, a DC-DC (step-up) converter, and a DC-DC (step-down) converter. A power loss appears as a product of three stages. For example, assuming the efficiency of one stage to be 0.95, 0.95×0.95×0.95=0.86 for three stages. In other words, even if the conversion efficiency is as high as 95%, the efficiency decreases to 86% in three stages. As seen above, even if the conversion efficiency of each stage is high, the conversion efficiency extremely decreases in multiple stages.

Nowadays, energy-saving electronic apparatuses are been demanded. As a measure of saving energy, it is required to improve the conversion efficiency of a power conversion apparatus for supplying power to a load. However, the improvement of conversion efficiency is limited in a conventional circuit configuration.

BRIEF DESCRIPTION OF THE DRAWINGS

FIG. 1 is a circuit diagram of a power conversion apparatus of a first embodiment;

FIG. 2 is a timing chart showing the relationship between an input voltage Vin, a circuit current I, and first and second pulse signals in the first embodiment;

FIG. 4 is a timing chart showing a circuit current I when the polarity of the input voltage Vin is positive, a clock signal CLK, a first pulse signal P1, a current flowing through a first switch Q1, and a current flowing through a second diode D2, in the first embodiment;

FIG. 7 is a flowchart showing the former half of a control procedure of a controller in the second embodiment;

FIG. 8 is a flowchart showing the latter half of a control procedure of a controller in the second embodiment;

FIG. 10 is a schematic diagram showing a method of generating a sub-pulse signal in the third embodiment;

FIG. 11 is a flowchart showing the latter half of a control procedure of a controller in the third embodiment;

FIG. 12 is a timing chart showing the relationship between an input voltage Vin, a circuit current I, and first and second pulse signals P1 and P2 in a fourth embodiment;

FIG. 14 is a timing chart showing a circuit current I when the polarity of the input voltage Vin is positive, a clock signal CLK, a first pulse signal P1, a second pulse P2, a current flowing through a first switch Q1, a current flowing through a second diode D2, and a current flowing through a second switch Q2, in the fourth embodiment;

FIG. 15 is a waveform chart showing a voltage change on starting when 100V and 200V AC power are supplied;

FIG. 16 is a circuit diagram showing a modification of a power conversion apparatus; and FIG. 17 is a circuit diagram showing another modification of a power conversion apparatus.

DETAILED DESCRIPTION

Figure 3:
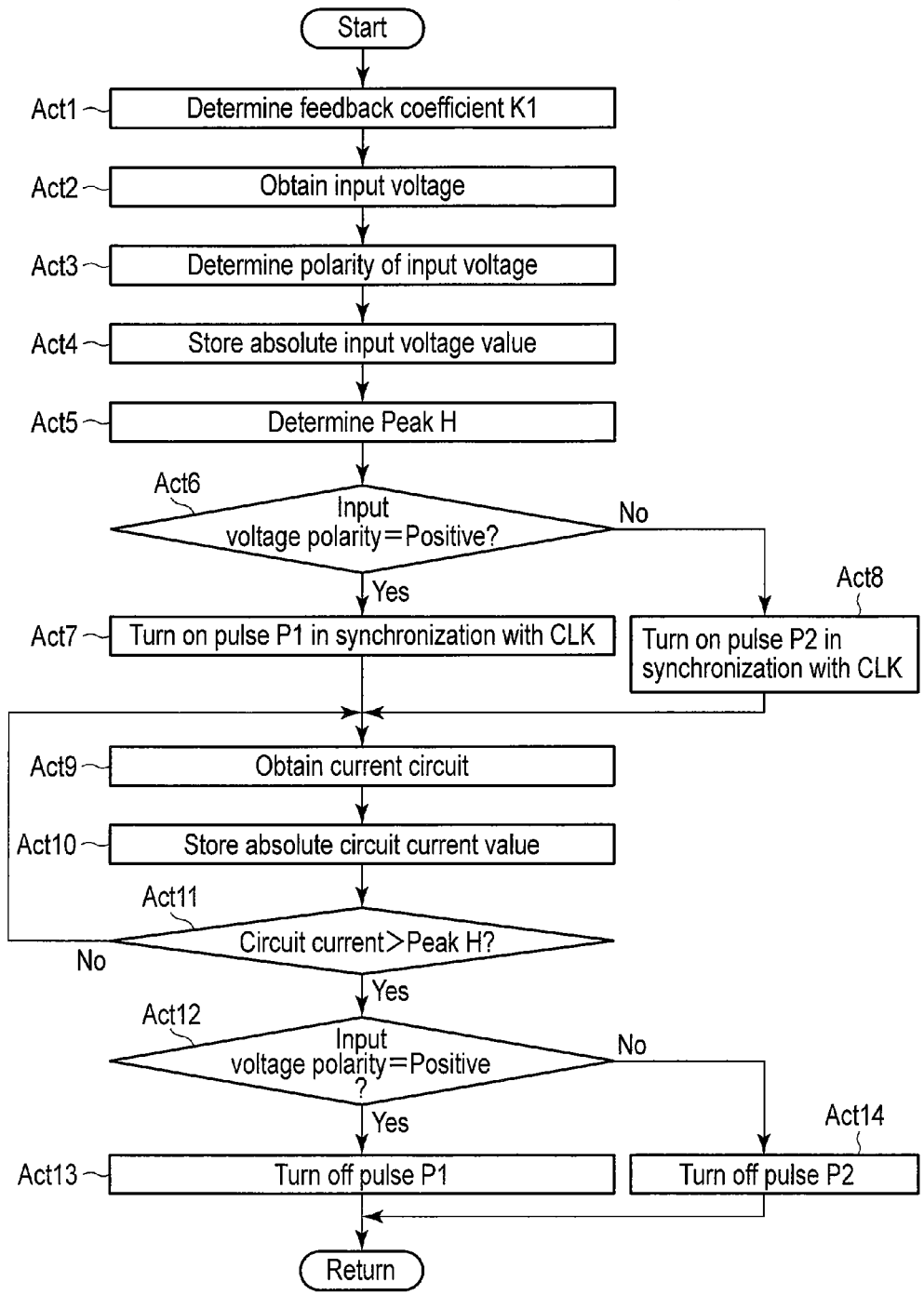
FIG. 3 is a flowchart showing a control procedure of a controller in the first embodiment.

In general, according to one embodiment, a power conversion apparatus includes a first switch, a second switch, an oscillator, an input voltage detector, a circuit current detector, an output voltage detector, a rated current value determinator, and a pulse signal output unit.

The first switch is connected at both ends of an AC power supply through an inductor and capacitor connected in series, and conducts when a pulse signal turns on, and becomes nonconductive when a pulse signal turns off. The second switch is connected at both ends of the first switch through a smoothing capacitor, and conducts when a pulse signal turns on, and becomes nonconductive when a pulse signal turns off. The oscillator generates a clock signal. The input voltage detector detects a voltage of an AC power supply. The circuit current detector detects a circuit current flowing through an inductor. The output voltage detector detects a voltage at both ends of a smoothing capacitor. The rated current value determinator determines a peak value of circuit current in each pulse cycle, from a corrected output voltage value by subtracting a predetermined reference voltage from an output voltage detected by the output voltage detector, and an input voltage detected by the input voltage detector. The pulse signal output unit outputs a pulse signal to the first switch when the polarity of input voltage is positive, and outputs a pulse signal to the second switch when the polarity of input voltage is negative. A pulse signal turns on in synchronization with a clock signal input from the oscillator, and is kept on until the circuit current detected by the circuit current detector reaches the peak value. A pulse signal turns off when the circuit current reaches the peak value, and turns on again in synchronization with the next clock signal.

Hereinafter, embodiments of a power conversion apparatus, which is supplied with utility power of 100V (50/60 Hz) as an AC power supply, converts the AC power to a desired DC voltage, and powers a load with the converted DC power, will be explained with reference the accompanying drawings.

[First Embodiment]

A first embodiment is explained with reference to FIGS. 1 to 4. FIG. 1 is a circuit diagram showing a power conversion apparatus 100 of a first embodiment.

In the power conversion apparatus 100, a first semiconductor switch Q1 is connected at both ends of an AC power supply 101 through an inductor L1 and capacitor C1 connected in series. The switch Q1 uses an N-channel MOSFET. Specifically, one end of the capacitor C1 is connected to one end of the AC power supply 101 through an inductor L1. A drain terminal of a MOSFET is connected to the other end of the capacitor C1. A source terminal of a MOSFET is connected to the other end of the AC power supply 101.

In the power conversion apparatus 100, a second semiconductor switch Q2 is connected at both ends of the first semiconductor switch Q1 through a smoothing capacitor C2 connected in series. The switch Q2 uses an N-channel MOSFET. Specifically, a source terminal of the MOSFET is connected to a point connecting the capacitor C1 and switch Q1. A drain terminal of the MOSFET Q2 is connected to a positive-electrode terminal of the smoothing capacitor C2. A negative terminal of the smoothing capacitor C2 is connected to a point connecting the AC power supply 101 and switch Q1.

In the power conversion apparatus 100, a first external diode D1 is connected in parallel to the first switch Q1. Specifically, an anode of the first diode D1 is connected at a point connecting the first switch Q1 and AC power supply 101, and a cathode of the first diode D1 is connected at a point connecting the first switch Q1 and capacitor C1.

In the power conversion apparatus 100, a second external diode D2 is connected in parallel to the second switch Q2. Specifically, an anode of the second diode D2 is connected at a point connecting the second switch Q2 and capacitor C1, and a cathode of the second diode D2 is connected at a point connecting the second switch Q2 and smoothing capacitor C2.

The first diode D1 has a forward voltage lower than that of a body diode of the first semiconductor switch Q1. The second diode D2 has a forward voltage lower than that of a body diode of the second semiconductor switch Q2.

In the power conversion apparatus 100, both ends of the smoothing capacitor C2 are output terminals 102 and 103. A desired load 104 is connected between the output terminals 102 and 103.

In the power conversion apparatus 100, an input voltage detector 105 is connected at both ends of the AC power supply 101. The input voltage detector 105 detects an input voltage Vin generated across the ends of the AC power supply 101, and sends a detected signal to the controller 110.

In the power conversion apparatus 100, a circuit current detector 106 is connected between the AC power supply 101 and a point connecting the first switch Q1 and first diode D1. The circuit current detector 106 detects a circuit current I flowing through the inductor L1, and sends a detected signal to the controller 110.

In the power conversion apparatus 100, an output voltage detector 107 is connected between output terminals 102 and 103. The output voltage detector 107 detects a voltage Vout across the output terminals 102 and 103, and sends a detected signal to the controller 110.

The controller 110, which is supplied with the input voltage Vin, circuit current I, and output voltage Vout, is further supplied with a clock signal CLK from the oscillator 108, and a reference voltage Vref. The controller 110 compares the output voltage Vout with the reference voltage Vref, and determines whether the output voltage Vout is higher or lower than the reference voltage Vref.

The controller 110 generates first and second pulse signals P1 and P2, based on the input voltage Vin, circuit current I, and output voltage Vout. The controller 110 supplies a first pulse signal P1 to the first switch Q1, and a second pulse signal P2 to the second switch Q2. The first switch Q1 conducts each time the first pulse signal P1 is supplied. The second switch Q2 conducts each time the second pulse signal P2 is supplied.

FIG. 2 is a waveform chart showing the relationship between an input voltage Vin, a circuit current I, and first and second pulse signals. In FIG. 2, the polarity of the AC voltage Va is positive in sections T1 and T2. In these sections, the controller 110 generates a first pulse signal P1 at a frequency far higher than a cycle of the AC voltage Va.

In FIG. 2, the polarity of the AC voltage Va is negative in sections T2 and T3. In these sections, the controller 110 generates a second pulse signal P2 at a frequency far higher than a cycle of the AC voltage Va.

Therefore, when the polarity of the AC voltage Va is positive, the first switch Q1 alternately becomes conductive and nonconductive. When the polarity of the AC voltage Va is negative, the second switch Q2 alternately becomes conductive and nonconductive. As a result, the circuit current I flowing through the inductor L1 becomes sinusoidal, similar to the input voltage Vin.

When an AC power is supplied and the controller 110 is actuated, the controller 110 takes in a clock signal CLK of a predetermined frequency oscillated by the oscillator 108. The controller 110 periodically takes in the output voltage Vout detected by the output voltage detector 107. Whenever taking in the output voltage Vout, the controller calculates a corrected output voltage value by subtracting the reference voltage Vref from the output voltage Vout, and integrates the corrected output voltage value at a low frequency.

At the timing to start power supply to the load 104 (a pulse output cycle), the controller 110 determines a feedback coefficient K1. The feedback coefficient K1 becomes a value higher than "1" when the output voltage Vout is lower than the reference voltage Vref, and a value lower than "1" when the output voltage Vout is higher than the reference voltage Vref. Therefore, the feedback coefficient K1 makes the output voltage Vout close to the reference voltage Vref.

Further, the feedback coefficient K1 becomes high when the corrected output voltage value is high, and low when the corrected output voltage value is low. The feedback coefficient K1 is determined from the corrected output voltage value after low frequency feedback, to prevent sudden feedback control in a circuit system. In other words, the feedback coefficient K1 gradually changes with the output voltage Vout.

FIG. 3 is a flowchart showing a control procedure of a controller 110. The controller 110 determines a low-frequency integrated value of a corrected output voltage value to be a first feedback coefficient K1. The controller 110 stores the first feedback coefficient K1 in a memory (Act 1).

The controller 110 takes in the input voltage Vin (Act 2), determines the polarity of the input voltage Vin, and stores flag data about the polarity in a memory (Act 3). For example, the controller stores flag data "1" when the polarity is positive, and flag data "0" when the polarity is negative.

The controller 110 obtains an absolute input voltage value except a polarity from the input voltage Vin, and stores the obtained value in a memory (Act 4). It is permitted to obtain the absolute input voltage value first, and store flag data in a memory later by determining the polarity of the input voltage.

The controller 110 calculates a maximum rated current value (Peak H) by multiplying the absolute input voltage value by the first feedback coefficient K1 (Act 5: a rated current value determinator).

The controller 110 determines the polarity of the input voltage Vin from the flag data (Act 6). When the flag data is "1" or the polarity of the input voltage Vin is positive (Yes in Act 6), the controller 110 turns on the first pulse signal P1 in synchronization with rising of the clock signal CLK (Act 7: a pulse signal output unit). When the flag data is "0" or the polarity of the input voltage Vin is negative (No in Act 6), the controller 110 turns on the second pulse signal P2 in synchronization of rising of the clock signal CLK (Act 8: a pulse signal output unit).

The controller 110 takes in the circuit current I (Act 9), obtains an absolute circuit current value except a polarity from the circuit current I, and stores the obtained value in a memory (Act 10).

The controller 110 determines whether the absolute circuit current value reaches the maximum rated current value (Peak H) (Act 11). When the absolute circuit current value does not reach the maximum rated current value (Peak H) (No in Act 11), the controller 110 takes in the circuit current I (Act 9), obtains an absolute circuit current value, and stores the obtained value in a memory (Act 10).

As described above, the controller 110 repeats the operations of Act 9 and Act 10 until the absolute circuit current value reaches the maximum rated current value (Peak H).

When the absolute circuit current value reaches the maximum rated current value (Peak H) (Yes in Act 11), the controller 110 determines the polarity of the input voltage Vin (Act 12). The controller 110 turns off the first pulse signal P1 (Act 13) when the polarity of the input voltage Vin is positive (Yes in Act 12), and turns off the second pulse signal P2 (Act 14) when the polarity of the input voltage Vin is negative (No in Act 12).

When the first or second pulse signal P1 or P2 turns off, one cycle of pulse output is terminated. Then, the controller returns to the operation of Act 1, which is the first step of the control procedure, and moves to the next one cycle. In other words, the controller 110 determines the first feedback coefficient K1 from the low-frequency integrated value of the corrected output voltage value. Thereafter, the controller 110 repeats the operations of Act 1 to Act 14 until power supply to the load 104 is completed.

The controller 110, which executes the control procedure described above, may be configured with software or hardware.

In the power conversion apparatus 100 configured as described above, when the polarity of the input voltage Vin is positive, the controller 110 supplies the first pulse signal P1 to the first switch Q1 in synchronization with a clock signal CLK. The first pulse signal P1 turns off when the circuit current I increases to a maximum rated current value (Peak H), and turns on when the next clock signal CLK is applied. In other words, the first pulse signal P1 turns on until the circuit current I reaches a maximum rated current value (Peak H) after a clock signal CLK is generated. The first pulse signal P1 turns off until the next clock signal is generated after the circuit current reaches a maximum rated current value (Peak H).

FIG. 4 shows a circuit current I when the polarity of the input voltage Vin is positive, a clock signal CLK, a first pulse signal P1, a current flowing through a first switch Q1, and a current flowing through a second diode D2. In an embodiment of the power conversion apparatus 100, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

As show in FIG. 4, the envelope curve Pe of the maximum rated current value (Peak H) for the circuit current I becomes sinusoidal, similar to the waveform of the input voltage Vin. The first pulse signal is kept on until the circuit current I reaches the maximum rated current value (Peak H), after turning on in synchronization with the clock signal CLK (at timing T11, T13, T15, T17, T19, T21, T23, and T25).

When the circuit current I reaches the maximum rated current value (Peak H) (at timing T12, T14, T16, T18, T20, T22, and T24), the first pulse signal P1 turns off. Thereafter, when the next clock signal is generated (at timing T13, T15, T17, T19, T21, T23, and T25), the first pulse signal P1 turns on again. Thereafter, until the polarity of the input voltage Vin becomes negative, the first pulse signal P1 repeats turning on and off as described above.

When the first pulse signal P1 turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 by the linear reactor action of the inductor L1 (in sections T11-T12, T13-T14, T15-T16, T17-T18, T19-T20, T21-T22, and T23-T24).

When the first pulse signal P1 turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T12-T13, T14-T15, T16-T17, T18-T19, T20-T21, T22-T23, and T24-T25).

Each time the first pulse signal P1 turns on and off, the power conversion apparatus 100 repeats the above operation. As a result, the power conversion apparatus 100 charges the smoothing capacitor C2 while increasing the output voltage Vout generated across the output terminals 102 and 103.

On the other hand, when the polarity of the input voltage Vin is negative, a second pulse signal P2 is supplied from the controller 110 to the second switch Q2 in synchronization with a clock signal CLK. The second pulse signal P2 is kept on until the circuit current I reaches a maximum rated current (Peak H), and turns off when the next clock signal CLK is applied. Thereafter, the second pulse signal P2 repeats turning on and off until the polarity of the input voltage Vin becomes positive.

When the second pulse signal P2 turns on, the second switch Q2 conducts. When the second switch Q2 conducts, a closed circuit comprising an AC power supply 101, an inductor L1, a capacitor C1, a second switch Q2, and a smoothing capacitor C2 is formed. At this time, the voltage of the smoothing capacitor C2 is higher than the AC voltage Va. As a result, the power conversion apparatus 100 is operated so that the charging voltage of the smoothing capacitor C2 returns to the AC power supply 101 through the second switch Q2 and inductor L1. Therefore, a current flows from the smoothing capacitor C2 to the second switch Q2.

When the second pulse signal P2 turns off, the second switch Q2 becomes nonconductive. When the second switch Q2 becomes nonconductive, the current flowing through the second switch Q2 becomes zero. At this time, the inductor L1 tends to flow a current in the same direction by the energy of a reactor. Therefore, a current flows into the capacitor C1 through the first diode D1 connected in parallel to the first switch Q1.

Each time the second pulse signal P2 turns on and off, the power conversion apparatus 100 repeats the above operation. As a result, the power conversion apparatus 100 recharges the capacitor C1.

The polarity of the AC voltage Va alternately becomes positive and negative. Therefore, the power conversion apparatus 100 repeats charging the smoothing capacitor C2 and recharging the capacitor C1. In other words, the power conversion apparatus 100 charges the smoothing capacitor C2 after recharging the capacitor C1. Therefore, when the smoothing capacitor C2 is charged, the electric charge stored in the capacitor C1 is moved to the smoothing capacitor C2.

If the first and second switch Q1 and Q2 do not operate, the circuit of the power conversion apparatus 100 shown in FIG. 1 functions as a voltage doubler circuit. In other words, when the input voltage is 100 V AC, for example, a DC voltage of about 200V is generated across the output terminals 102 and 103.

As described above, when the first and second switch Q1 and Q2 operate, the electric charge stored in the capacitor C1 is moved to the smoothing capacitor C2. Therefore, the pressor effect of the power conversion apparatus 100 is added. As a result, the power conversion apparatus 100 increases the input AC voltage Va to a value higher than the value double the input voltage, and obtains a DC output voltage Vout substantially equal to the reference voltage Vref.

As described above, according to the first embodiment, the power conversion apparatus 100 can supply power to the load 104 by converting the AC voltage obtained from the AC power supply 101 to a DC voltage without full-wave rectification. A diode bridge circuit for full-wave rectification becomes unnecessary, the number of circuit components is reduced, and the cost is reduced. Further, in the power conversion apparatus 100, a loss caused by a forward voltage generated in a diode bridge is eliminated, and efficient power conversion is realized.

Further, in the power conversion apparatus 100, the input current is controlled to have a sinusoidal waveform similar to the waveform of the input voltage. Therefore, the input current becomes sinusoidal. This prevents harmonics in the input current, and realizes power conversion with minimum noise. Generally, it is necessary to provide a power factor converter (PFC) to prevent harmonics in an input current. A power factor converter is unnecessary in the power conversion apparatus 100. In other words, the power conversion apparatus 100 realizes the functions of a full-wave rectifier and power factor converter in one circuit, and increases the conversion efficiency.

Further, as apparent from FIG. 4, the circuit current I flowing through the inductor L1 has a small difference between a peak value and an average value. The ratings of circuit components such as an inductor L1, a capacitor C1, and semiconductor switches Q1 and Q2 are determined by a peak value of circuit current. If a peak value is extremely different from an average value of circuit current, the cost of circuit components is increased. On the other hand, in the power conversion apparatus 100, the difference between a peak value and an average value of circuit current can be reduced, and magnetic saturation of the inductor L1, ripple current of the capacitor C1, and maximum currents of the first and second semiconductor switches Q1 and Q2 can be rated with an allowance. As a result, the power conversion apparatus 100 can reduce the costs.

In addition, in the power conversion apparatus 100, the output timing of first and second pulse signals P1 and P2 is synchronized with a clock signal CLK. Therefore, the frequencies of first and second pulse signals P1 and P2 are fixed. If the frequencies of the pulse signals S1 and S2 are variable, the frequencies of pulse signals S1 and S2 increase in an area where the input voltage is close to zero. In the power conversion apparatus 100, the frequencies of first and second pulse signals P1 and P2 are fixed, and such an unnecessary high frequency can be prevented. Therefore, the power conversion apparatus 100 can decrease the driving power.

[Second Embodiment]

A second embodiment is explained with reference to FIGS. 5 to 9. The circuit configuration of a power conversion apparatus 200 in a second embodiment is similar to the first embodiment. Therefore, FIG. 1 is used, and the parts common to those shown in FIG. 1 are given the same reference numbers, and detailed explanation therefore is omitted.

Figure 5:
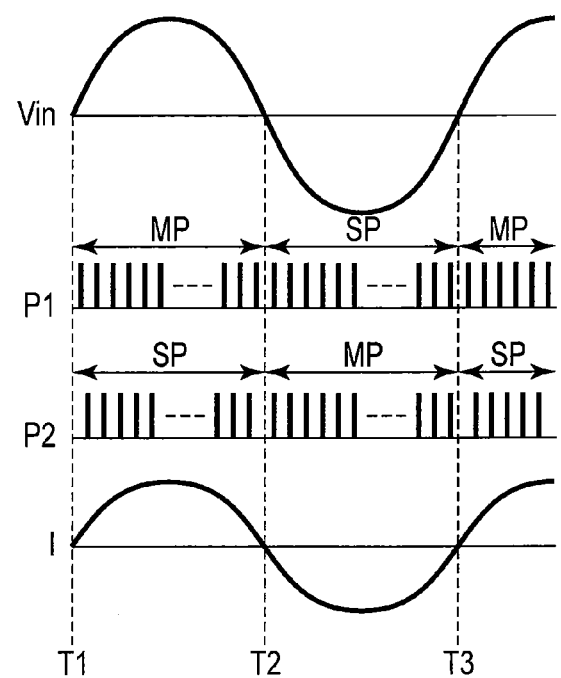
FIG. 5 is a timing chart showing the relationship between an input voltage Vin, a circuit current I, and first and second pulse signals P1 and P2 in the second embodiment.

FIG. 5 is a waveform chart showing the relationship between an input voltage Vin, a circuit current I, and first and second pulse signals P1 and P2 in a power conversion apparatus 200. In FIG. 5, the polarity of the AC voltage Va is positive in sections T1 and T2. In the positive polarity sections, the controller 110 generates a first pulse signal P1 at a frequency far higher than a cycle of the AC voltage Va. In the second embodiment, a first pulse signal P1 in a section where the polarity of the AC voltage Va is positive is called a main pulse signal MP for the first switch Q1.

Further, in a section where the polarity of the AC voltage Va is positive, the controller 110 generates a second pulse signal P2 each time the first pulse signal P1 turns off. In the second embodiment, a second pulse signal P2 in a section where the polarity of the AC voltage Va is positive is called a sub-pulse signal SP for the second switch Q2.

In FIG. 5, the polarity of the AC voltage Va is negative in sections T2 and T3. In the negative polarity sections, the controller 110 generates a second pulse signal P2 at a frequency far higher than a cycle of the AC voltage Va. In the second embodiment, a second pulse signal P2 in a section where the polarity of the AC voltage Va is negative is called a main pulse signal MP for the second switch Q2.

Further, in a section where the polarity of the AC voltage Va is negative, the controller 110 generates a first pulse signal P1 each time the second pulse signal P2 turns off. In the second embodiment, a first pulse signal P1 in a section where the polarity of the AC voltage Va is negative is called a sub-pulse signal SP for the first switch Q1.

As described above, also in the second embodiment, the first switch Q1 repeats conducting and non-conducting in a section where the polarity of the AC voltage Va is positive, and the second switch Q2 repeats conducting and non-conducting in a section where the polarity of the AC voltage Va is negative. As a result, the circuit current I flowing through the inductor L1 becomes sinusoidal, similar to the input voltage Vin.

Figure 6:
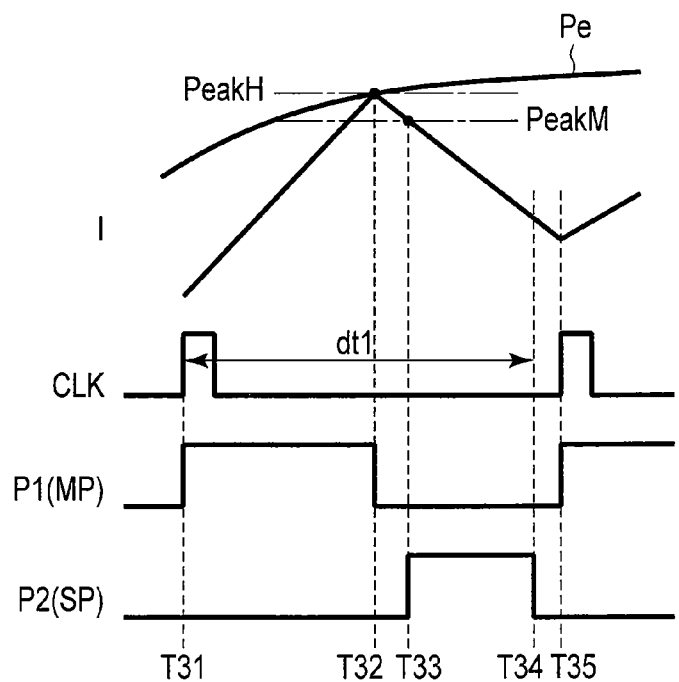
FIG. 6 is a schematic diagram showing a method of generating a sub-pulse signal in the second embodiment.

A method of generating a sub-pulse signal SP is explained with reference to FIG. 6. FIG. 6 shows only parts of an envelop curve Pe of a maximum rated current value (Peak H) when the polarity of the input voltage Vin is positive, a circuit current I, a clock signal CLK, a first pulse signal P1 (MP) as a main pulse signal, and a second pulse signal P2 (SP) as a sub-pulse signal.

As indicated by timing T31 and T32, the first main pulse signal P1 (MP) turns on in synchronization with a clock signal CLK, and turns off when the current circuit I reaches a maximum rated current value (Peak H). On the other hand, as indicated by timing T33 and T34, the second sub-pulse signal P2 (SP) turns on when the circuit current I reaches a rated sub-pulse turn-on value (Peak M), and turns off when time dt1 elapses from a previous clock signal CLK. The rated sub-pulse turn-on value (Peak M) is a little lower than the maximum rated current value (Peak H). The time dt1 is a little shorter than a cycle of the clock signal CLK.

By generating such a sub-pulse signal P2 (SP) for a main pulse signal P1 (MP), a minute delay time (T32 to T33) is generated between falling of the first main pulse signal P1 (MP) and rising of the second sub-pulse signal P2 (SP). A minute delay time (T34 to T35) is generated between falling of the second sub-pulse signal P2 (SP) and rising of the first main pulse signal P1 (MP). Therefore, the first main pulse signal P1 (MP) and second sub-pulse signal P2 (SP) do not simultaneously turn on.

Even if the first main pulse signal P1 (MP) and second sub-pulse signal P2 (SP) simultaneously turn on, a through-current flows through the first and second switches Q1 and Q2, and the smoothing capacitor C2 is shorted. The above delay time prevents such a short circuit.

Similarly, when the polarity of the input voltage Vin is negative, the second main pulse signal P2 (MP) turns on in synchronization with a clock signal CLK, and turns off when the circuit current I reaches a maximum rated current value (Peak H). The first sub-pulse signal P1 (SP) turns on when the circuit current I reaches a rated sub-pulse turn-on value (Peak M), and turns off when the time dt1 elapses from a previous clock signal CLK.

By generating such a sub-pulse signal P1 (SP) for a main pulse signal P2 (MP), the second main pulse signal P2 (MP) and first sub-pulse signal P1 (SP) do not simultaneously turn on.

FIGS. 7 and 8 are flowcharts showing a control procedure of the controller 110. Also in the second embodiment, the controller 110 periodically calculates a corrected output voltage value (output voltage Vout-reference voltage Vref), and integrates the corrected output voltage value at a low frequency.

At the timing to start power supply to the load 104 (a pulse output cycle), the controller 110 determines the low-frequency integrated value of the corrected output voltage value to be a first feedback coefficient K1. Further, the controller 110 determines a value obtained by multiplying a first feedback coefficient K1 by a certain ratio a (1>a>0) to be a second feedback coefficient K2. The controller 110 stores the first and second feedback coefficients K1 and K2 (K1>K2) in a memory.

Similarly to the operations of Act 2 to Act 4 in the first embodiment, the controller 110 takes in the input voltage Vin (Act 22), determines the polarity of the input voltage Vin (Act 23), and stores flag data indicating the polarity and absolute input voltage value in a memory (Act 24).

The controller 110 calculates a maximum rated current value (Peak H) and a minimum rated current value (Peak L) (Act 25). The maximum rated current value (Peak H) is the product of the absolute input voltage value and first feedback coefficient K1. The minimum rated current value (Peak L) is the product of the absolute input voltage value and second feedback coefficient K2 (a rated current value determinator).

The controller 110 determines the polarity of the input voltage Vin (Act 26). When the polarity of the input voltage Vin is positive (Yes in Act 26), the controller 110 turns on the first main pulse signal P1 (MP) in synchronization with rising of a clock signal CLK (Act 27: a pulse signal output unit). When the polarity of the input voltage Vin is negative (No in Act 26), the controller 110 turns on the second main pulse signal P2 (MP) in synchronization with rising of a clock signal CLK (Act 28: a pulse signal output unit).

When the first main pulse signal P1 (MP) or second main pulse signal P2 (MP) turns on, the controller 110 starts the first timer T1 (Act 29).

The controller 110 takes in the circuit current I (Act 30), obtains an absolute circuit current value except a polarity from the circuit current I, and stores the obtained value in a memory (Act 31).

The controller 110 determines whether the absolute circuit current value reaches the maximum rated current value (Peak H) (Act 32). When the absolute circuit current value does not reach the maximum rated current value (Peak H) (No in Act 32), the controller 110 takes in the circuit current I (Act 30), obtains an absolute circuit current value, and stores the obtained value in a memory (Act 31).

As described above, the controller 110 repeats the operations of Act 30 and Act 31 until the absolute circuit current value reaches the maximum rated current value (Peak H).

When the absolute circuit current value reaches the maximum rated current value (Peak H) (Yes in Act 32), the controller 110 determines the polarity of the input voltage Vin (Act 33). The controller 110 turns off the first main pulse signal P1 (MP) (Act 34) when the polarity of the input voltage Vin is positive (Yes in Act 33), and turns off the second main pulse signal P2 (MP) (Act 35) when the polarity of the input voltage Vin is negative (No in Act 32).

When the first main pulse signal P1 (MP) or second main pulse signal P2 (MP) turns off, the controller 110 takes in the circuit current I (Act 36), obtains an absolute circuit current value, and stores the obtained value in a memory (Act 37).

The controller 110 determines whether the absolute circuit current value reaches the rated sub-pulse turn-on value (Peak MH) (Act 38). When the absolute circuit current value does not reach the rated sub-pulse turn-on value (Peak MH) (No in Act 38), the controller 110 takes in the circuit current I (Act 36), obtains an absolute circuit current value, and stores the obtained value in a memory (Act 37).

As described above, the controller 110 repeats the operations of Act 36 and Act 37 until the absolute circuit current value decreases to the rated sub-pulse turn-on value (Peak MH).

When the absolute circuit current value decreases to the rated sub-pulse turn-on value (Peak MH) (Yes in Act 38), the controller 110 determines the polarity of the input voltage Vin (Act 39). When the polarity of the input voltage Vin is positive (Yes in Act 39), the controller 110 turns on the second sub-pulse signal P2 (SP) (Act 40: a pulse signal output unit). When the polarity of the input voltage Vin is negative (No in Act 39), the controller 110 turns on the first sub-pulse signal P1 (SP) (Act 41: a pulse signal output unit).

When the first sub-pulse signal P1 (SP) or second sub-pulse signal P2 (SP) turns on, the controller 110 waits until the first timer T1 counts the time dt1 (Act 42). When the first timer counts the time dt1 (Yes in Act 42), the controller 110 determines the polarity of the input voltage Vin (Act 43). When the polarity of the input voltage Vin is positive (Yes in Act 43), the controller 110 turns off the second sub-pulse signal P2 (SP) (Act 44). When the polarity of the input voltage Vin is negative (No in Act 43), the controller 110 turns off the first sub-pulse signal P1 (SP) (Act 45).

When the first sub-pulse signal P1 (SP) or second sub-pulse signal P2 (SP) turns off, one cycle of pulse output is terminated. Then, the controller returns to the operation of Act 21 that is the first step of the control procedure, and moves to the next one cycle. In other words, the controller 110 determines the first and second feedback coefficients K1 and K2 from the low-frequency integrated value of the corrected output voltage value. Thereafter, the controller 110 repeats the operations of Act 21 to Act 45 until power supply to the load 104 is completed.

In the power conversion apparatus 200 configured as described above, when the polarity of the input voltage Vin is positive, a first pulse signal P1 is supplied from the controller 110 to the first switch Q1 as a main pulse signal MP. The first main pulse signal P1 (MP) turns off when the circuit current I increases to a maximum rated current value (Peak H), and turns on when the next clock signal CLK is generated. In other words, the first pulse signal P1 turns on until the circuit current I reaches the maximum rated current value (Peak H) after a clock signal CLK is generated. The first pulse signal P1 turns off until the next clock signal is generated after the circuit current I reaches the maximum rated current value (Peak H).

When the polarity of the input voltage Vin is positive and the first main pulse signal P1 (MP) turns off, a second pulse signal P2 is supplied from the controller 110 to the second switch Q2 as a sub-pulse signal SP. The second sub-pulse signal P2 (SP) turns on when the circuit current I decreases to the rated sub-pulse turn-on value (Peak M), and turns off when the time dt1 elapses from a previous clock signal CLK.

Figure 9:
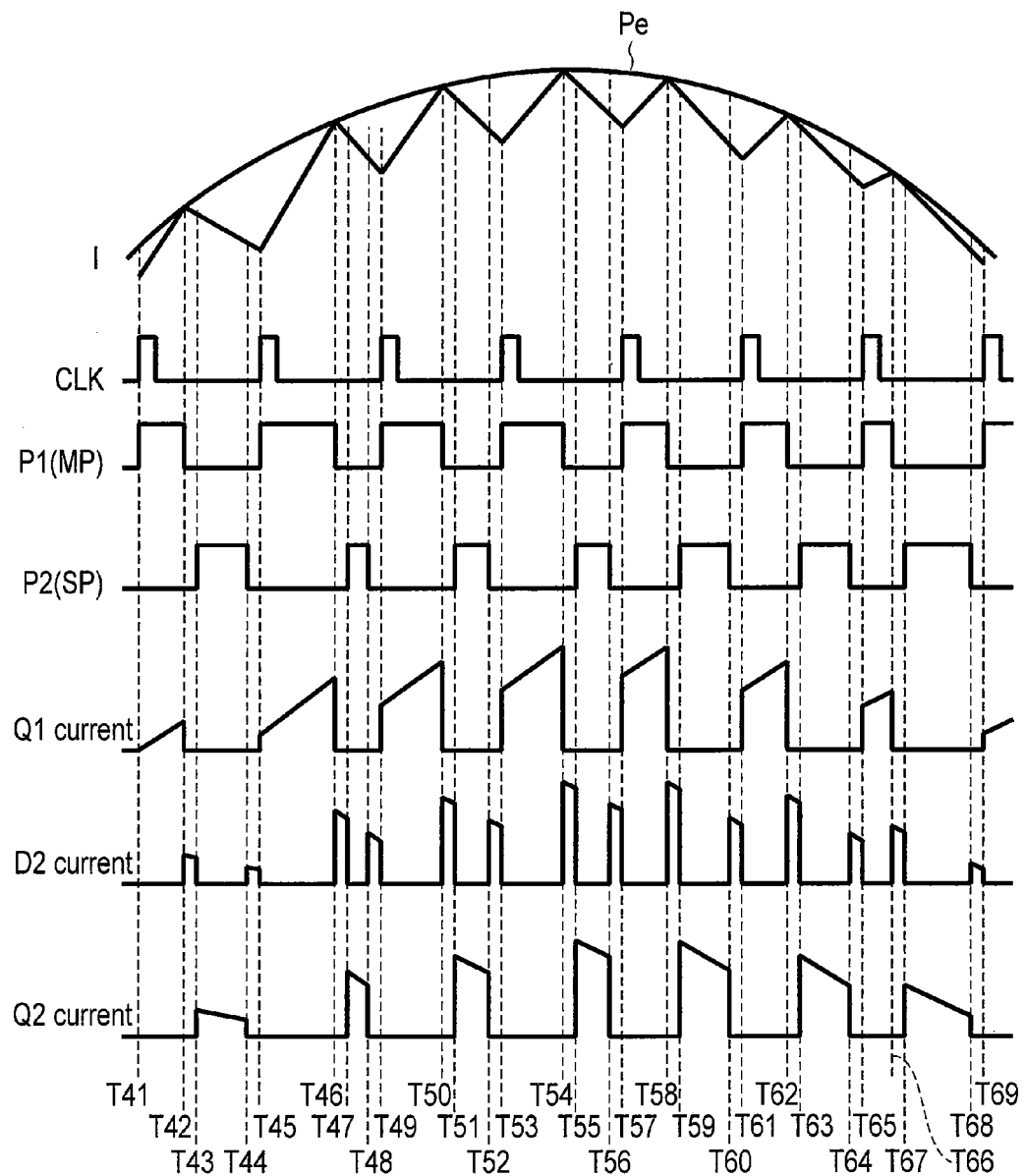
FIG. 9 is a timing chart showing a circuit current I when the polarity of the input voltage Vin is positive, a clock signal CLK, a first pulse signal P1, a second pulse signal P2, a current flowing through a first switch Q1, a current flowing trough a second diode, and a current flowing through a second switch Q2, in the second embodiment.

FIG. 9 shows a circuit current I when the polarity of the input voltage Vin is positive, a clock signal CLK, a first main pulse signal P1 (MP), a second main pulse signal P2 (SP), a current flowing through a first switch Q1, a current flowing through a second diode D2, and a current flowing through a second switch Q2. In an embodiment of the power conversion apparatus 200, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

As shown in FIG. 9, the envelope curve Pe of the maximum rated current value (Peak H) for the circuit current I is sinusoidal, similar to the waveform of the input voltage Vin. Once the first pulse signal P1 (MP) turns on in synchronization with a clock signal CLK (at timing T41, T45, T49, T53, T57, T61, T65, and T69), it is kept on until the circuit current I reaches the maximum rated current value (Peak H).

When the circuit current I reaches the maximum rated current value (Peak H) (at timing T42, T46, T50, T54, T58, T62, and T66), the first main pulse signal P1 (MP) turns off. When the next clock signal CLK is applied (at timing T45, T49, T53, T57, T61, T65, and T69), the first main pulse signal P1 (MP) turns on again. Thereafter, until the polarity of the input voltage Vin becomes negative, the first main pulse signal P1 (MP) repeats turning on and off as described above.

On the other hand, the second sub-pulse signal P2 (SP) turns off until the circuit current I reaches the maximum rated current value (Peak H). When the circuit current I decreases to the rated sub-pulse turn-on value (Peak M) after reaching the maximum rated current value (Peak H) (at timing T43, T47, T51, T55, T59, T63, and T67), the second sub-pulse signal P2 (SP) turns on. When the time dt1 elapses from a previous clock signal CLK (at timing T44, T48, T52, T56, T60, T64, and T68), the second sub-pulse signal P2 (SP) turns off. Thereafter, until the polarity of the input voltage Vin becomes negative, the second sub-pulse signal P2 (SP) repeats turning on and off as described above.

When the first main pulse signal P1 (MP) turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 by the linear reactor action of the inductor L1 (in sections T41-T42, T45-T46, T49-T50, T53-T54, T57-T58, T61-T62, and T65-T66).

When the first main pulse signal P1 (MP) turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T42-T43, T46-T47, T50-T51, T54-T55, T58-T59, T62-T63, and T66-T67).

Each time the first main pulse signal P1 (MP) turns on and off, the power conversion apparatus 200 repeats the above operation. As a result, the power conversion apparatus 200 charges the smoothing capacitor C2 while increasing the output voltage Vout across the output terminals 102 and 103.

When the first main pulse signal P1 (MP) turns off and the circuit current I decreases to the rated sub-pulse turn-on value (Peak M), the second sub-pulse signal P2 (SP) turns on. The second sub-pulse signal P2 (SP) turns on until the time dt1 elapses from a previous clock signal CLK, and turns off when the time dt1 expires.

When the second sub-pulse signal P2 (SP) turns on, the second switch Q2 conducts. When the second switch Q2 conducts, the current flowing into the smoothing capacitor C2 through the second diode D2 flows into the smoothing capacitor C2 through the second switch Q2 (in sections T43-T44, T47-T48, T51-T52, T55-T56, T59-T60, T63-T64, and T67-T68).

When the time dt1 elapses and the second sub-pulse signal P2 (SP) turns off, the second switch Q2 becomes nonconductive. When the second switch Q2 becomes nonconductive, the current flowing into the smoothing capacitor C2 through the second switch Q2 flows again into the smoothing capacitor C2 through the second diode D2 (in sections T44-T45, T48-T49, T52-T53, T56-T57, T60-T61, T64-T65, and T68-T69).

Each time the second sub-pulse signal P2 (SP) turns on and off, the power conversion apparatus 200 repeats the above operation. As a result, the current I flowing into the smoothing capacitor C2 flows through the second diode D2 immediately after the first switch Q1 turns off and immediately before the first switch Q1 turns on, and flows through the second switch Q2 in the other time.

On the other hand, when the polarity of the input voltage Vin is negative, a second main pulse signal P2 (MP) is supplied from the controller 110 to the second switch Q2. The second main pulse signal P2 (MP) is kept on until the circuit current I reaches the maximum rated current (Peak H), and turns off when the circuit current reaches the maximum rated current value (Peak H). When the next clock signal CLK is applied, the second main pulse signal P2 (MP) turns on again.

When the polarity of the input voltage Vin is negative and the second main pulse signal P2 (MP) turns off, the first sub-pulse signal P1 (SP) is supplied from the controller 110 to the first switch Q1. The first sub-pulse signal P1 (SP) turns on when the circuit current I decreases to the rated sub-pulse turn-on value (Peak M), and turns off when the time dt1 elapses from a previous clock signal.

Thereafter, until the polarity of the input voltage Vin becomes positive, the first sub-pulse signal P1 (SP) and second main pulse signal P2 (MP) repeat turning on and off as described above.

When the second main pulse signal P2 (MP) turns on, the second switch Q2 conducts. When the second switch Q2 conducts, a closed circuit comprising an AC power supply 101, an inductor L1, a capacitor C1, a second switch Q2, and a smoothing capacitor C2 is formed. At this time, the voltage of the smoothing capacitor C2 is higher than the AC voltage Va. As a result, the power conversion apparatus 200 is operated so that the charging voltage of the smoothing capacitor C2 returns to the AC power supply 101 through the second switch Q2 and inductor L1. Therefore, a current flows from the smoothing capacitor C2 to the second switch Q2.

When the second main pulse signal P2 (MP) turns off, the second switch Q2 becomes nonconductive. When the second switch Q2 becomes nonconductive, the current flowing through the second switch Q2 becomes zero. At this time, the inductor L1 tends to flow a current in the same direction by the energy of a reactor. Therefore, a current flows into the capacitor C1 through the first diode D1 connected in parallel to the first switch Q1.

Each time the second main pulse signal P2 (MP) turns on and off, the power conversion apparatus 200 repeats the above operation. As a result, the power conversion apparatus 200 recharges the capacitor C1.

When the second main pulse signal P2 (MP) turns off and the circuit current I decreases to the rated sub-pulse turn-on value (Peak M), the first sub-pulse signal P1 (SP) turns on. The first sub-pulse signal P1 (SP) turns on until the time dt1 elapses from a previous clock signal CLK, and turns off when the time dt1 expires.

When the first sub-pulse signal P1 (SP) turns on, the first switch Q1 conducts. When the first switch Q1 conducts, the current flowing into the capacitor C1 through the first diode D1 flows into the capacitor C1 through the first switch Q1.

When the time dt1 elapses from a previous clock signal and the first sub-pulse signal P1 (SP) turns off, the first switch Q1 becomes nonconductive. When the first switch Q1 becomes nonconductive, the current flowing into the capacitor C1 through the first switch Q1 flows again into the capacitor C1 through the first diode D1.

Each time the first sub-pulse signal P1 (SP) turns on and off, the power conversion apparatus 200 repeats the above operation. As a result, the current I flowing into the capacitor C1 flows through the first diode D1 immediately after the second switch Q2 turns off and immediately before the second switch Q2 turns on, and flows through the first switch Q1 in the other time.

The polarity of the AC voltage Va alternately becomes positive and negative. Therefore, the power conversion apparatus 200 repeats charging of the smoothing capacitor C2 and recharging of the capacitor C1. In other words, the power conversion apparatus 200 charges the smoothing capacitor C2 after recharging the capacitor C1. Therefore, when the smoothing capacitor C2 is charged, the electric charge stored in the capacitor C1 is moved to the smoothing capacitor C2. Therefore, the pressor effect of the power conversion apparatus 200 is added. Therefore, functions and effects similar to those of the first embodiment are provided.

In addition, in the power conversion apparatus 200 of the second embodiment, the current, which has flowed through the second diode D2 since the first switch Q1 turns off, flows into the second switch Q2 after a lapse of a minute delay time. The current flows again through the second diode D2 immediately before the first switch Q1 turns on.

Similarly, since the second switch Q2 turns off, the current which has flowed through the first diode D1 flows into the first switch Q1 when a minute delay time elapses after the second switch Q2 turns off. The current flows again into the first diode D1 immediately before the second switch Q2 turns on.

The turn-on resistance of the first and second switches Q1 and Q2 is much lower than that of the diodes D1 and D2. Therefore, in the power conversion apparatus 200, the power conversion efficiency can be increased still further as compared with the power conversion apparatus 100 of the first embodiment.

Further, the power conversion efficiency can be increased much more by matching the timing to turn on/off the first and second switch Q1 and Q2. However, the semiconductor switches Q1 and Q2 may simultaneously turn on due to uneven characteristics. If the first and second switches Q1 and Q2 simultaneously turn on, a through-current flows and shorts the circuit.

To prevent such a defect, in the power conversion apparatus 200, the second switch Q2 turns on when a minute delay time elapses after the first switch Q1 turns on. Contrarily, the first switch Q1 turns on when a minute delay time elapses after the second switch Q2 turns off. Therefore, the first and second switches Q1 and Q2 do not simultaneously turn on in any section, and a defect to cause a short circuit does not occur.

[Third Embodiment]

A third embodiment is explained with reference to FIGS. 10 and 11. The circuit configuration of a power conversion apparatus 300 is similar to that of the first embodiment. Therefore, FIG. 1 is used, and the parts common to those in FIG. 1 are given the same reference numbers, and detailed explanation therefore is omitted.

In the third embodiment, a method of generating a sub-pulse signal SP is different from the second embodiment. The method of generating a sub-pulse signal SP in the third embodiment is explained with reference to FIG. 10.

FIG. 10 shows only parts of an envelop curve Pe of maximum rated current value (Peak H) when the polarity of the input voltage Vin is positive, a circuit current I, a clock signal CLK, a first main pulse signal P1 (MP), and a second main pulse signal P2 (SP).

As indicated by timing T31 and T32, the first main pulse signal P1 (MP) turns on in synchronization with a clock signal CLK, and turns off when the current circuit I reaches a maximum rated current value (Peak H). On the other hand, as indicated by timing T33 and T34, the second sub-pulse signal P2 (SP) turns on when minute time dt2 elapses after the circuit current I reaches the maximum rated current value (Peak H), and turns off when the time dt1 elapses from a previous clock signal CLK. The time dt1 is a little shorter than a cycle of clock signal CLK.

By generating such a sub-pulse signal P2 (SP) for a main pulse signal P1 (MP), a minute delay time (T32 to T33) is generated between falling of the first main pulse signal P1 (MP) and rising of the second sub-pulse signal P2 (SP). A minute delay time (T34 to T35) is generated between falling of the second sub-pulse signal P2 (SP) and rising of the first main pulse signal P1 (MP). Therefore, the first main pulse signal P1 (MP) and second sub-pulse signal P2 (SP) do not simultaneously turn on.

FIG. 11 is a flowchart showing a control procedure of the controller 110. FIG. 11 corresponds to FIG. 8 explained in the second embodiment. The same reference numbers are given to the parts common to the second embodiment. The control procedure explained in the second embodiment shown in FIG. 7 is also applied to the third embodiment. In other words, at the timing to start power supply to the load 104 (a pulse output cycle), the controller of the power conversion apparatus 300 executes the operations of Act 21 to Act 32 explained in the second embodiment.

As seen by comparing FIG. 11 with FIG. 8, the operation of the controller 110 of the power conversion apparatus 300 is different from the second embodiment after the first main pulse signal P1 (MP) or second main pulse signal P2 (MP) turns off in Acts 34 and 35.

In other words, in the third embodiment, when the first main pulse signal P1 (MP) or second main pulse signal P2 (MP) turns off, the controller 110 causes a second timer T2 to start counting (Act 51), and waits until the second timer T2 counts time dt2 (Act 52).

When the second timer T2 counts the time dt2 (Yes in Act 52), the controller 110 moves to the operation of Act 39 as explained in the second embodiment. The controller 110 determines the polarity of the input voltage Vin. When the polarity of the input voltage Vin is positive (Yes in Act 39), the controller turns on the second sub-pulse signal P2 (SP) (Act 40: a pulse signal output unit). When the polarity of the input voltage Vin is negative (No in Act 39), the controller turns on the first sub-pulse signal P1 (SP) (Act 41: a pulse signal output unit).

Thereafter, the controller 110 executes operations similar to Act 42 to Act 45 in the second embodiment, and turns off the first sub-pulse signal P1 (SP) or second sub-pulse signal P2 (SP).

When the first sub-pulse signal P1 (SP) or second sub-pulse signal P2 (SP) turns off, the controller 110 returns to the operation of Act 21 that is the first step of the control procedure, and moves to the next one cycle.

The power conversion apparatus 300 configured as described above can provide functions and effects similar to those of the power conversion apparatus 200 of the second embodiment.

[Fourth Embodiment]

A fourth embodiment is explained with reference to FIGS. 12 and 14. The circuit configuration of a power conversion apparatus 400 of the fourth embodiment is similar to that of the first embodiment. Therefore, FIG. 1 is used, and the parts common to those in FIG. 1 are given the same reference numbers, and detailed explanation therefore is omitted.

FIG. 12 is a waveform chart showing the relationship between an input voltage Vin, a circuit current I, and first and second pulse signals P1 and P2 in the power conversion apparatus 400. In FIG. 12, the polarity of the AC voltage Va is positive in sections T1 and T2. In the positive polarity sections, the controller 110 generates a first pulse signal P1 at a frequency far higher than a cycle of the AC voltage Va. In the fourth embodiment, a first pulse signal P1 in a section where the polarity of the AC voltage Va is positive is called a main pulse signal MP for the first switch Q1.

As indicated in positive polarity sections T4 and T5, when the circuit current I flowing through the inductor L1 exceeds a predetermined threshold value SHL, the controller 110 generates a second pulse signal P2 at each time the first pulse signal P1 turns off. In the fourth embodiment, the second pulse signal P2 generated each time the first pulse signal P1 turns off is called a sub-pulse signal SP for the second switch Q2.

In FIG. 12, the polarity of the AC voltage Va is negative in sections T2 and T3. In the negative polarity sections, the controller 110 generates a second pulse signal P2 at a frequency far higher than a cycle of the AC voltage Va. In the fourth embodiment, a second pulse signal P2 in a section where the polarity of the AC voltage Va is negative is called a main pulse signal MP for the second switch Q2.

As indicated in positive polarity sections T6 and T7, when the circuit current I flowing through the inductor L1 exceeds a predetermined threshold value SHL, the controller 110 generates a first pulse signal P1 each time the second pulse signal P2 turns off. In the fourth embodiment, the first pulse signal P1 generated each time the second pulse signal P2 turns off is called a sub-pulse signal SP for the first switch Q1.

As described above, also in the fourth embodiment, the first switch Q1 repeats conducting and non-conducting when the polarity of the AC voltage Va is positive, and the second switch Q2 repeats conducting and non-conducting when the polarity of the AC voltage Va is negative. As a result, the circuit current I flowing through the inductor L1 becomes sinusoidal, similar to the input voltage Vin.

Figure 13:
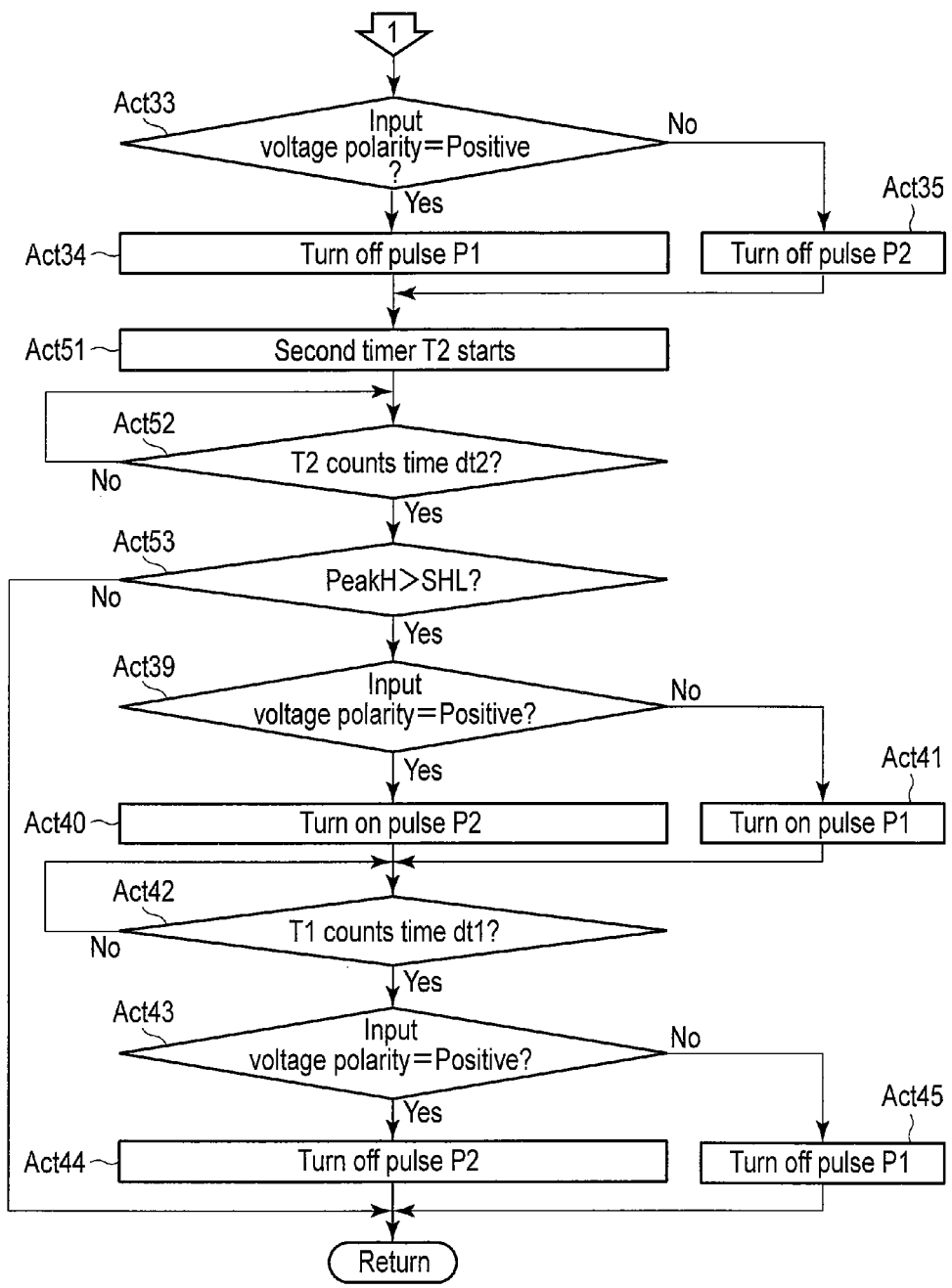
FIG. 13 is a flowchart showing the latter half of a control procedure of a controller in the fourth embodiment.

FIG. 13 is a flowchart showing a control procedure of the controller 110. FIG. 13 corresponds to FIG. 11 explained in the third embodiment. The parts common to those in the third embodiment are given the same reference numbers. The control procedure shown in FIG. 7 explained in the second embodiment is applicable to the fourth embodiment. In other words, at the timing to start power supply to the load 104 (a pulse output cycle), a controller 110 of the power conversion apparatus 400 executes the operations of Act 21 to Act 32 explained in the second embodiment.

As seen by comparing FIG. 13 with FIG. 11, the operation of the controller 110 of the power conversion apparatus 400 is different from the third embodiment after the second timer T2 counts the time dt2 in Act 52.

In other words, in the fourth embodiment, the controller 110 determines whether a maximum rated current value (Peak H) at the present time exceeds a preset threshold value SHL (Act 53: a determinator).

When the maximum rated current value (Peak H) does not exceed the threshold value SHL (No in Act 53), the controller 110 returns to the operation of Act 21 that is the first step of the control procedure, and moves to the next one cycle.

On the other hand, when the maximum rated current value (Peak H) exceeds the threshold value SHL (Yes in Act 53), the controller 110 moves to the operation of Act 39 explained in the second embodiment. In other words, the controller 110 determines the polarity of the input voltage Vin. When the polarity of the input voltage Vin is positive (Yes in Act 39), the controller turns on the second sub-pulse P2 (SP) (Act 40: a pulse signal output unit). When the polarity of the input voltage Vin is negative (No in Act 39), the controller turns on the first sub-pulse P1 (SP) (Act 41: a pulse signal output unit).

Thereafter, the controller 110 executes the operations similar to Acts 42 to 45 in the second embodiment, and turns off the first sub-pulse P1 (SP) or second sub-pulse signal P2 (SP).

Then, when the first sub-pulse signal P1 (SP) or second sub-pulse signal P2 (SP) turns off, the controller returns to the operation of Act 21 that is the first step of the control procedure, and moves to the next one cycle.

In the power conversion apparatus 400 configured as described above, when the polarity of the input voltage Vin is positive, the controller 110 supplies a first main pulse signal P1 (MP) to the first switch Q1, as in the second or third embodiment.

Similarly to the second and third embodiments, when the voltage of the input voltage Vin is positive and the first main pulse signal P1 (MP) turns off, the controller 110 supplies a second sub-pulse signal P2 (SP) to the second switch Q2.

However, in the fourth embodiment, only when the maximum rated current value (Peak H) exceeds a predetermined threshold value SHL, a second sub-pulse signal P2 (SP) is supplied to the second switch Q2.

FIG. 14 shows a circuit current I when the polarity of the input voltage Vin is positive, a clock signal CLK, a first pulse signal P1 (MP), a second pulse signal P2 (SP), a current flowing through a first switch Q1, a current flowing through a second diode D2, and a current flowing through a second switch Q2. In an embodiment of the power conversion apparatus 400, a frequency of the AC power supply 101 is set to 50 Hz, and switching frequencies of the first and second switches Q1 and Q2 are set to 100 kHz. However, a description of the operation at a frequency of 100 kHz becomes complicated, and the operation at a very loose frequency is described in the drawing.

As shown in FIG. 14, the envelope curve Pe of the maximum rated current value (Peak H) for the circuit current I is sinusoidal, similar to the waveform of the input voltage Vin. Once the first pulse signal P1 (MP) turns on in synchronization with a clock signal CLK (at timing T71, T73, T75, T79, T83, T87, T91, and T93), it is kept on until the circuit current I reaches the maximum rated current value (Peak H).

When the circuit current I reaches the maximum rated current value (Peak H) (at timing T72, T74, T76, T80, T84, T88, and T92), the first main pulse signal P1 (MP) turns off. Thereafter, when the next clock signal CLK is applied (at timing T73, T75, T79, T83, T87, T91, and T93), the first main pulse signal P1 (MP) turns on again. Thereafter, until the polarity of the input voltage Vin becomes negative, the first main pulse signal P1 (MP) repeats turning on and off as described above.

On the other hand, the second sub-pulse signal P2 (SP) turns off until the maximum rated current value (Peak H) of the circuit current I exceeds the threshold value SHL. When the maximum rated current value (Peak H) of the circuit current I exceeds the threshold value SHL, and the minute time dt2 elapses after the circuit current I reaches the maximum rated current value (Peak H) (at timing T77, T81, T85, and T89), the second sub-pulse signal P2 (SP) turns on. When the predetermined time dt1 elapses from a previous clock signal CLK (at timing T78, T82, T86, and T90), the second sub-pulse signal P2 (SP) turns off. Thereafter, until the maximum rated current value (Peak H) of the circuit current I deceases to lower than the threshold value SHL, the second sub-pulse signal P2 (SP) repeats turning on and off as described above.

When the first main pulse signal P1 (MP) turns on, the first switch Q1 conducts. When the first switch Q1 conducts, a closed circuit comprising an AC power supply 101, an inductor L1, a capacitor C1, and a first switch Q1 is formed. As a result, a current flows from the capacitor C1 to the first switch Q1 by the linear reactor action of the inductor L1 (in sections T71-T72, T73-T74, T75-T76, T79-T80, T83-T84, T87-T88, and T91-T92).

When the first main pulse signal P1 (MP) turns off, the first switch Q1 becomes nonconductive. When the first switch Q1 becomes nonconductive, the current flowing through the first switch Q1 becomes zero. At this time, the inductor L1 tends to flow a current in the same direction by the energy of a reactor. Therefore, a current flows into the smoothing capacitor C2 through the second diode D2 connected in parallel to the second switch Q2 (in sections T72-T73, T74-T75, T76-T79, T80-T83, T84-T87, T88-T91, and T92-T93).

Each time the first main pulse signal P1 (MP) turns on and off, the power conversion apparatus 400 repeats the above operation. As a result, the power conversion apparatus 400 charges the smoothing capacitor C2 while increasing the output voltage Vout across the output terminals 102 and 103.

When the maximum rated current value (Peak H) of the circuit current I exceeds the threshold value SHL, and the minute time dt2 elapses after the first pulse signal P1 turns off, the second sub-pulse signal P2 (SP) turns on. The second sub-pulse signal P2 (SP) is kept on until the predetermined time dt1 elapses from a previous clock signal CLK, and turns off when the time dt1 expires.

Until the second sub-pulse signal P2 (SP) turns on, a current flows into the smoothing capacitor C2 through the second diode D2 (in sections T76-T77, T80-T81, T84-T85, and T88-T89). When the second sub-pulse signal P2 (SP) turns on, the second switch Q2 conducts. When the second switch Q2 conducts, the current flowing into the smoothing capacitor C2 through the second diode D2 flows into the smoothing capacitor C2 through the second switch Q2 (in sections T77-T78, T81-T82, T85-T86, and T89-T90).

When the predetermined time dt1 elapses from a previous clock signal CLK, and the second sub-pulse signal P2 (SP) turns off, the second switch Q2 becomes nonconductive. When the second switch Q2 becomes nonconductive, the current flowing into the smoothing capacitor C2 through the second switch Q2 flows again into the smoothing capacitor C2 through the second diode D2 (in sections T78-T79, T82-T83, T86-T87, and T90-T91).

Each time the second sub-pulse signal P2 (SP) turns on and off, the power conversion apparatus 400 repeats the above operations. As a result, when the maximum rated current value (Peak H) of the circuit current I exceeds the threshold value SHL, the current I flowing into the smoothing capacitor C2 flows through the second diode D2 immediately after the first switch Q1 turns off and immediately before the first switch Q1 turns on, and flows through the second switch Q2 in the other time.

As described above, in the power conversion apparatus 400, when the circuit current I is high, a sub-pulse signal SP is generated, so that the current flowing through the diodes D1 and D2 is bypassed through the first switch Q1 or second switch Q2. When the circuit current I is low, the effect of bypassing the current through the first Q1 or second switch Q2 is low, and power to drive the semiconductor switches Q1 and Q2 is required. Therefore, as in the power conversion apparatus 400 of the fourth embodiment, a sub-pulse signal SP is generated when the circuit current I is high, thereby the conversion efficiency can be increased higher than the power conversion apparatuses 200 and 300 of the second and third embodiments.

Modifications of the embodiments are explained hereinafter.

For example, in the fourth embodiment, when the minute time dt2 elapses after the circuit current I reaches the maximum rated current value (Peak H), the first sub-pulse signal P1 (SP) or second sub-pulse signal (SP) turns on. On this point, a rated sub-pulse turn-on value (Peak M) is set to a little lower than the maximum rated current value (Peak H), as in the second embodiment. When the circuit current I decreases to the rated sub-pulse turn-on value (Peak M) after reaching the maximum rated current value (Peak H), the first sub-pulse signal P1 (SP) or second sub-pulse signal P2 (SP) may turn on. In this case, the second timer T2 can be omitted.

In each embodiment, a commercial power supply of 100V (50/60 Hz) is used as an AC power supply. However, an AC power supply is not limited to a 100V commercial power supply. For example, a commercial power supply of 200 to 220V (50/60 Hz) may be used as an input power supply, and may be converted to a desired DC voltage for supplying power to a load.

FIG. 15 shows waveforms showing a voltage change during startup when power of 100V AC and 200V AC are applied. When 100V AC is applied, a voltage charged in a smoothing capacitor C2 is about 200V as indicated by E1 in FIG. 15. On the other hand, when 200V AC is supplied, a voltage charged in the smoothing capacitor C2 is about 400V as indicated by E2 in FIG. 15. In either case, when switching is started (at timing t0), an output voltage is controlled to be equal to a reference voltage (600V in this example).

In each embodiment, the circuit shown FIG. 1 is used as a basic configuration. However, a basic configuration is not limited to the one shown in FIG. 1. Other examples of basic configuration are shown in FIGS. 16 and 17.

FIG. 16 shows a circuit diagram of a modification, in which a first external diode D1 connected in parallel to a first semiconductor switch Q1 and second diode D2 connected in parallel to a second semiconductor switch Q2 are omitted. The semiconductor switches Q1 and Q2 have a built-in body diode. In the circuit shown in FIG. 16, the body diodes of the semiconductor switches Q1 and Q2 are used instead of the external diodes D1 and D2.

FIG. 17 shows another modification, in which mechanical switches S1 and S2 are used as a pair of switches operated by first and second pulse signals P1 and P2, instead of semiconductor switches Q1 and Q2. A semiconductor switch such as a triac having no body diode can be used instead of the mechanical switches S1 and S2.

Further, an inductor L1 and capacitor C1 connected to an AC power supply 101 are connected in series. One end of the capacitor C1 can be connected to one end of the AC power supply 101, and the other end can be connected to the semiconductor switch Q1 or mechanical switch S1 through the inductor L1.

A position to detect a circuit current I is not limited to the position indicated in each embodiment. For example, a current flowing through the AC power supply 101 and inductor L1 may be detected as a circuit current I, by connecting the inductor L1 to one end of the AC power supply 101 through current detectors 501 and 602, and connecting the capacitor to the other end of the AC power supply 101. Or, a secondary winding L2 is provided in the inductor L1, and the circuit current I may be detected from the voltage generated in the secondary winding L2.

Low-resistance resistors R1 and R2 may be connected to the first and second semiconductors switches Q1 and Q2, and peak current detectors 81 and 82 may be connected to both ends of the low-resistance resistors R1 and R2. A peak current may be detected by converting a current flowing through the low-resistance resistors R1 and R2 to a voltage value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
a first switch connected at both ends of an AC power supply through an inductor and capacitor connected in series, which conducts when a pulse signal turns on, and becomes nonconductive when a pulse signal turns off;
a second switch connected at both ends of
the first switch through a smoothing capacitor connected in series, which conducts when the pulse signal turns on, and becomes nonconductive when the pulse signal turns off;
an oscillator which generates a clock signal;
an input voltage detector which detects a voltage of the AC power supply as an input voltage;
a circuit current detector which detects a circuit current flowing through the inductor;
an output voltage detector which detects a voltage at both ends of the smoothing capacitor as an output voltage;
a rated current value determinator which determines a peak value of a circuit current in each pulse cycle, from a corrected output voltage by subtracting a predetermined reference voltage from an output voltage detected by the output voltage detector, and an input voltage detected by the input voltage detector; and
a pulse signal output unit which outputs a pulse signal, which turns on in synchronization with a clock signal applied from the oscillator, keeps on until a circuit current detected by the circuit current detector reaches the peak value, turns off when the circuit current reaches the peak value, and thereafter, turns on again in synchronization with the next clock signal, to the first switch when the polarity of the input voltage is positive, and to the second switch when the polarity of the input voltage is negative.

2. The apparatus of claim 1, wherein the first and second switches are semiconductor switches having a body diode.

3. The apparatus of claim 1, further comprising a diode externally connected in parallel to the first and second switches.

4. The apparatus of claim 1, wherein the rated current value determinator further determines a rated turn-on value close to the peak value, and a rated turn-off value close to the lower limit value, between the peak value and lower limit value.

5. The apparatus of claim 4, wherein the pulse signal output unit outputs a pulse signal, which turns on when a circuit current detected by the circuit current detector decreases to the rated turn-on value after reaching the peak value, and thereafter, turns off when a time shorter than a cycle of the clock signal elapses from a previous clock signal, to the second switch when the polarity of the input voltage is positive, and to the first switch when the polarity of the input voltage is negative.

6. The apparatus of claim 4, further comprising a determinator which determines whether the peak value determined by the rated current value determinator is higher than a predetermined value.

7. The apparatus of claim 6, wherein if the determinator determines that the peak value is higher than the predetermined value, the pulse signal output unit outputs a pulse signal, which turns on when a circuit current detected by the circuit current detector decreases to the rated turn-on value after reaching the peak value, and thereafter, turns off when a time shorter than a cycle of the clock signal elapses, to the second switch when the polarity of the input voltage is positive, and to the first switch when the polarity of the input voltage is negative.

8. The apparatus of claim 1, wherein the pulse signal output unit outputs a pulse signal, which turns on when a predetermined time elapses after a circuit current detected by the circuit current detector reaches the peak value, and thereafter, turns off when a time shorter than a cycle of the clock signal elapses from a previous clock signal, to the second switch when the polarity of the input voltage is positive, and to the first switch when the polarity of the input voltage is negative.

9. The apparatus of claim 8, further comprising a determinator which determines whether the peak value determined by the rated current value determinator is higher than a predetermined value.

10. The apparatus of claim 9, wherein if the determinator determines that the peak value is higher than the predetermined value, the pulse signal output unit outputs a pulse signal, which turns on when a predetermined time elapses after a circuit current detected by the circuit current detector reaches the peak value, and thereafter, turns off when a time shorter than a cycle of the clock signal elapses from a previous clock signal, to the second switch when the polarity of the input voltage is positive, and to the first switch when the polarity of the input voltage is negative.

11. A power conversion method comprising:
connecting a first switch which conducts when a pulse signal turns on, and becomes nonconductive when a pulse signal turns off, at both ends of an AC power supply through an inductor and capacitor connected in series;
connecting a second switch which conducts when the pulse signal turns on, and becomes nonconductive when the pulse signal turns off, at both ends of the first switch through a smoothing capacitor connected in series; and
generating a clock signal by an oscillator,
wherein a rated current value determinator determines a peak value of circuit current in each pulse cycle, from a corrected output voltage by subtracting a predetermined reference voltage from an output voltage detected by an output voltage detector which detects a voltage at both ends of a smoothing capacitor as an output voltage, and an input voltage detected by an input voltage detector which detects a voltage of the AC power supply as an input voltage, and
a pulse signal output unit outputs a pulse signal, which turns on in synchronization with a clock signal applied from the oscillator, keeps on until a circuit current detected by a circuit current detector which detects a circuit current flowing through the inductor, turns off when the circuit current reaches the peak value, and thereafter, turns on again in synchronization with the next clock signal, to the first switch when the polarity of the input voltage is positive, and to the second switch when the polarity of the input voltage is negative.

12. The method of claim 11, wherein the first and second switches are semiconductor switches having a body diode.

13. The method of claim 11, wherein a diode is externally added in parallel to the first and second switches.

14. The method of claim 11, wherein the rated current value determinator further determines a rated turn-on value close to the peak value, and a rated turn-off value close to the lower limit value, between the peak value and lower limit value.

15. The method of claim 14, wherein the pulse signal output unit outputs a pulse signal, which turns on when a circuit current detected by the circuit current detector decreases to the rated turn-on value after reaching the peak value, and thereafter, turns off when a time shorter than a cycle of the clock signal elapses from a previous clock signal, to the second switch when the polarity of the input voltage is positive, and to the first switch when the polarity of the input voltage is negative.

16. The method of claim 14, wherein a determinator determines whether the peak value determined by the rated current value determinator is higher than a predetermined value.

17. The method of claim 16, wherein if the determinator determines that the peak value is higher than the predetermined value, the pulse signal output unit outputs a pulse signal, which turns on when a circuit current detected by the circuit current detector decreases to the rated turn-on value after reaching the peak value, and thereafter, turns off when a time shorter than a cycle of the clock signal elapses from a previous clock signal, to the second switch when the polarity of the input voltage is positive, and to the first switch when the polarity of the input voltage is negative.

18. The method of claim 11, wherein the pulse signal output unit outputs a pulse signal, which turns on when a predetermined time elapses after a circuit current detected by the circuit current detector reaches the peak value, and thereafter, turns off when a time shorter than a cycle of the clock signal elapses from a previous clock signal, to the second switch when the polarity of the input voltage is positive, and to the first switch when the polarity of the input voltage is negative.

19. The method of claim 18, wherein a determinator determines whether the peak value determined by the rated current value determinator is higher than a predetermined value.

20. The method of claim 19, wherein if the determinator determines that the peak value is higher than the predetermined value, the pulse signal output unit outputs a pulse signal, which turns on when a predetermined time elapses after the circuit current detected by the circuit current detector reaches the peak value, and thereafter, turns off when a time shorter than a cycle of the clock signal elapses from a previous clock signal, to the second switch when the polarity of the input voltage is positive, and to the first switch when the polarity of the input voltage is negative.

* * * * *